(12) United States Patent (10) Patent No.: US 12,684,177 B2

Ramesh et al. (45) Date of Patent: Jul. 14, 2026

(54) PRODUCTION PLATFORM

(71) Applicant: Roku, Inc., San Jose, CA (US)

(72) Inventors: Sunil Ramesh, Saratoga, CA (US);
Charles Brian Pinkerton, Boulder, CO
(US); Michael Patrick Cutter, Golden,
CO (US); David Lee Stern, Los Gatos,
CA (US); Andrew Peter Fogg, Los
Gatos, CA (US); Karina Levitian,
Austin, TX (US)

(73) Assignee: Roku, Inc., San Jose, CA (US)

( * ) Notice: Subject to any disclaimer, the term of this
patent is extended or adjusted under 35
U.S.C. 154(b) by 169 days.

(21) Appl. No.: 18/503,726

(22) Filed: Nov. 7, 2023

(65) Prior Publication Data

US 2025/0150643 A1 May 8, 2025

(51) Int. Cl.
*H04N 21/218* (2011.01)
*G06T 17/00* (2006.01)

(52) U.S. Cl.
CPC ....... *H04N 21/21805* (2013.01); *G06T 17/00*
(2013.01)

(58) Field of Classification Search
CPC ......... H04N 21/21805; H04N 21/2187; H04N
21/23418; H04N 21/234345; H04N
21/816; G06T 17/00
USPC ...................................................... 348/218.1
See application file for complete search history.

(56) References Cited

U.S. PATENT DOCUMENTS

| 11,558,678 | B2 * | 1/2023 | Tang | ................. | H04N 21/8113 |
| 2011/0074926 | A1 * | 3/2011 | Khan | .................. | H04N 13/246 |
| | | | | | 348/46 |

| 2018/0270427 | A1 * | 9/2018 | Damstra | .......... | H04N 21/21805 |
| 2019/0057721 | A1 * | 2/2019 | Ying | ....................... | G11B 27/19 |
| 2022/0006945 | A1 * | 1/2022 | Bathija | .................. | H04N 23/90 |
| 2022/0256231 | A1 | 8/2022 | Eniwumide | | |

OTHER PUBLICATIONS

Extended European Search Report dated Feb. 7, 2025 in EP
Application No. 24210420.6, 9 pages.
Taneja, Aparna, et al. "3D Reconstruction and Video-Based Rendering of Casually Capture Videos," Oct. 10, 2010, 18th International Conference, Austin, TX, USA, Sep. 24-27, 2015; [Lecture Notes in Computer Science; Lect.Notes Computer], Springer, Berlin, Heidelberg, ISBN: 978-3-540-74549-5, 27 pages.

* cited by examiner

*Primary Examiner* — Lin Ye
*Assistant Examiner* — Chan T Nguyen
(74) *Attorney, Agent, or Firm* — Akona IP PC

(57) ABSTRACT

Camera equipment used for capturing a live event is expensive and may require professionals to operate the equipment. Such camera equipment is not accessible for capturing events and experiences by everyday users. Suppose media content is captured by lower-cost input devices such as mobile phones with a video camera. A production platform can use computer vision techniques to produce enhanced media content from media content captured by the lower-cost input devices. In one example, the production platform can aggregate and analyze the received media content to extract information and determine blind spots. The production platform can create or retrieve content based on the extracted information and insert the content in the blind spots. The production platform can deliver enhanced media content to an end user device, the enhanced media content may have the received media content and the inserted content.

20 Claims, 12 Drawing Sheets

340

320

= BLIND SPOT     = SALIENT AREA

= CONTENT CAPTURE USER DEVICE

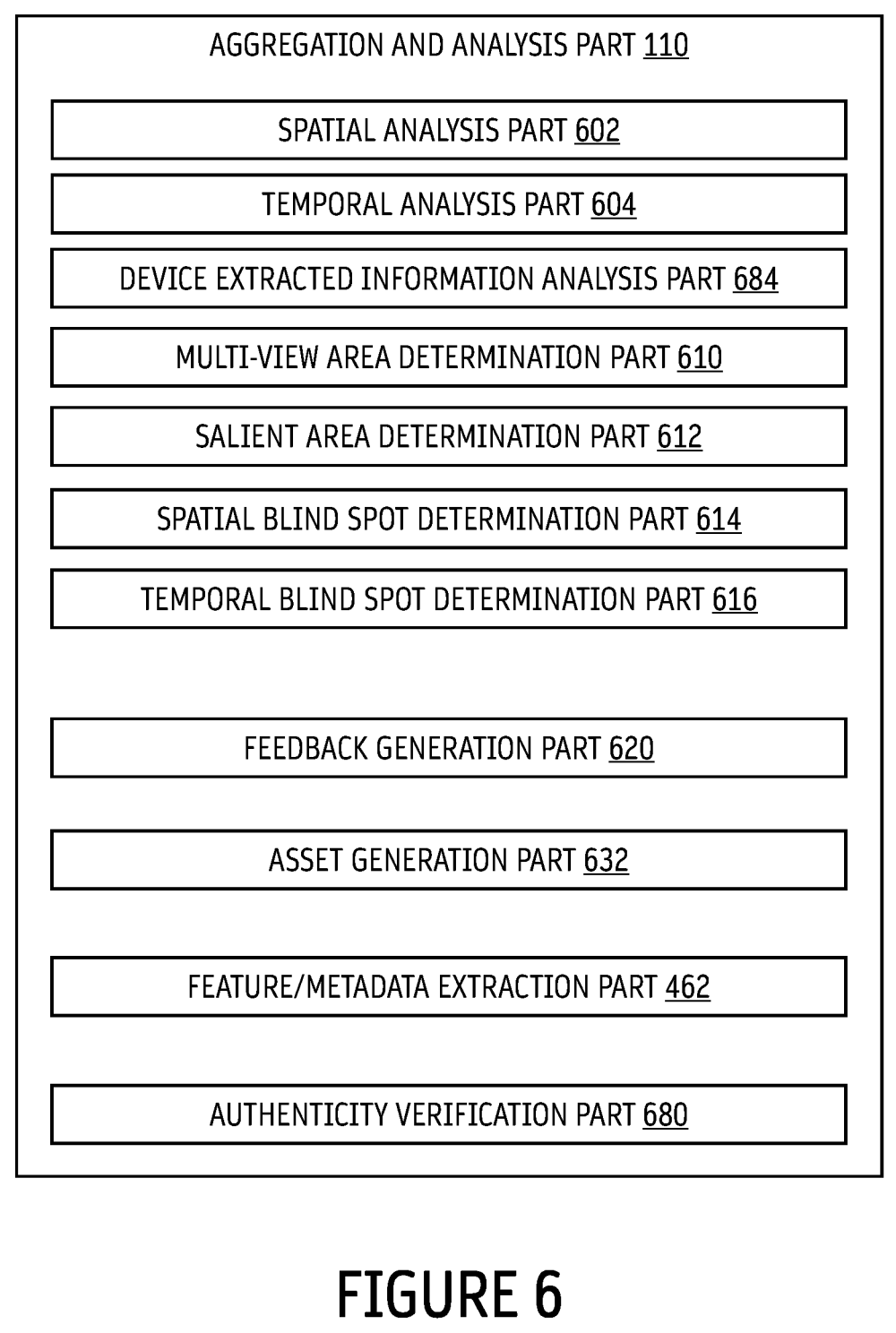

AGGREGATION AND ANALYSIS PART 110

SPATIAL ANALYSIS PART 602

TEMPORAL ANALYSIS PART 604

DEVICE EXTRACTED INFORMATION ANALYSIS PART 684

MULTI-VIEW AREA DETERMINATION PART 610

SALIENT AREA DETERMINATION PART 612

SPATIAL BLIND SPOT DETERMINATION PART 614

TEMPORAL BLIND SPOT DETERMINATION PART 616

FEEDBACK GENERATION PART 620

ASSET GENERATION PART 632

FEATURE/METADATA EXTRACTION PART 462

AUTHENTICITY VERIFICATION PART 680

FIGURE 6

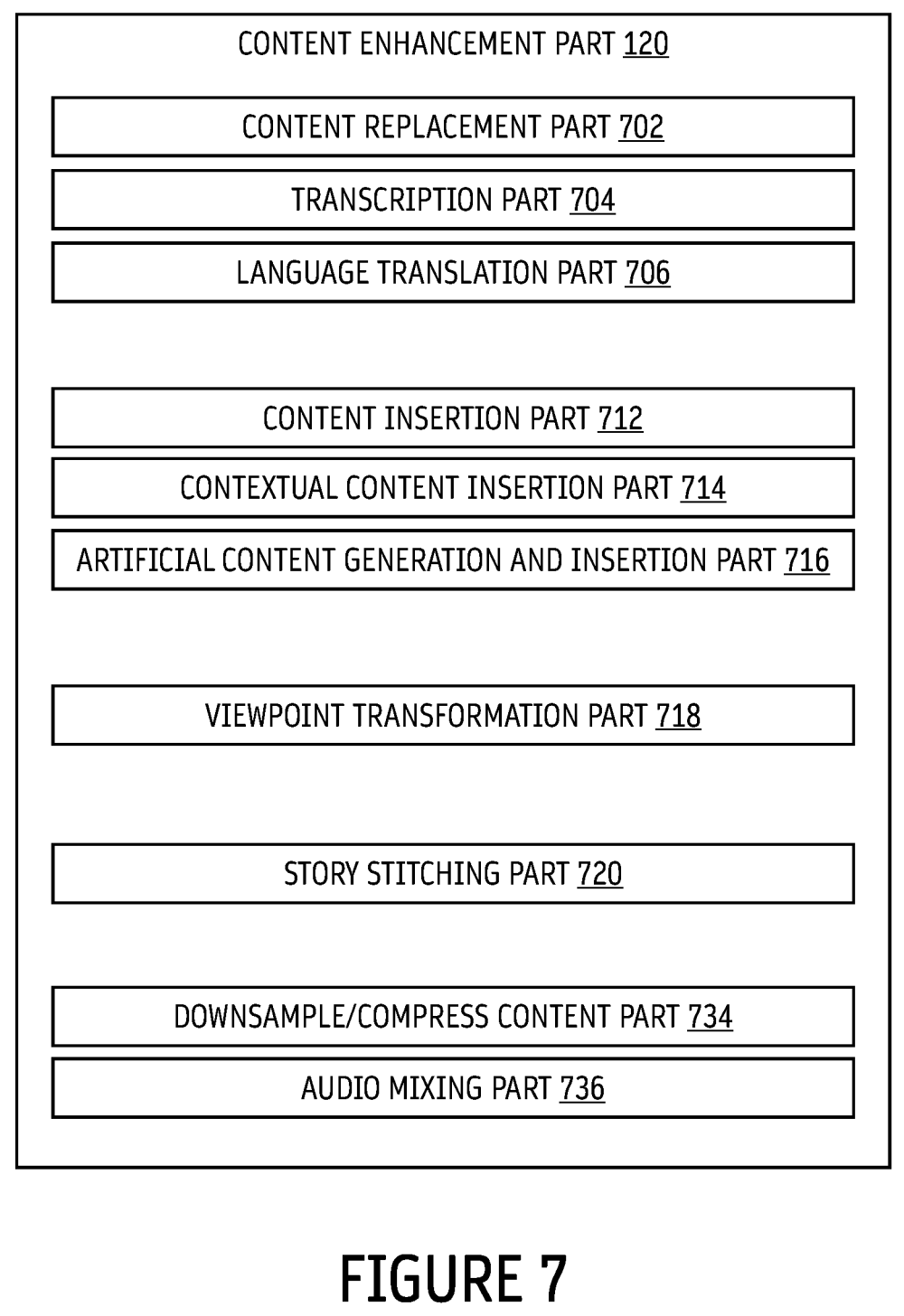

CONTENT ENHANCEMENT PART 120

CONTENT REPLACEMENT PART 702

TRANSCRIPTION PART 704

LANGUAGE TRANSLATION PART 706

CONTENT INSERTION PART 712

CONTEXTUAL CONTENT INSERTION PART 714

ARTIFICIAL CONTENT GENERATION AND INSERTION PART 716

VIEWPOINT TRANSFORMATION PART 718

STORY STITCHING PART 720

DOWNSAMPLE/COMPRESS CONTENT PART 734

AUDIO MIXING PART 736

FIGURE 7

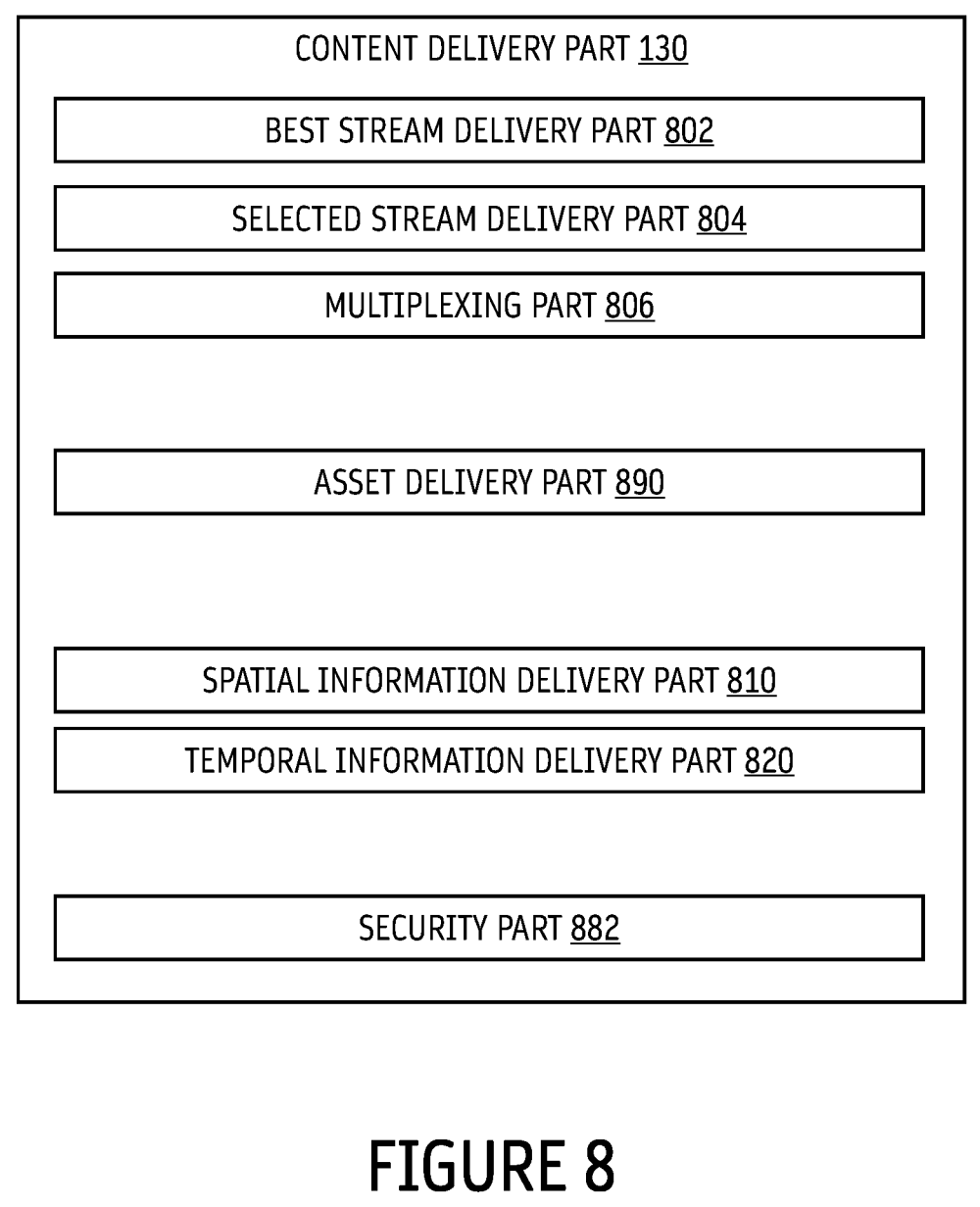

CONTENT DELIVERY PART 130

BEST STREAM DELIVERY PART 802

SELECTED STREAM DELIVERY PART 804

MULTIPLEXING PART 806

ASSET DELIVERY PART 890

SPATIAL INFORMATION DELIVERY PART 810

TEMPORAL INFORMATION DELIVERY PART 820

SECURITY PART 882

FIGURE 8

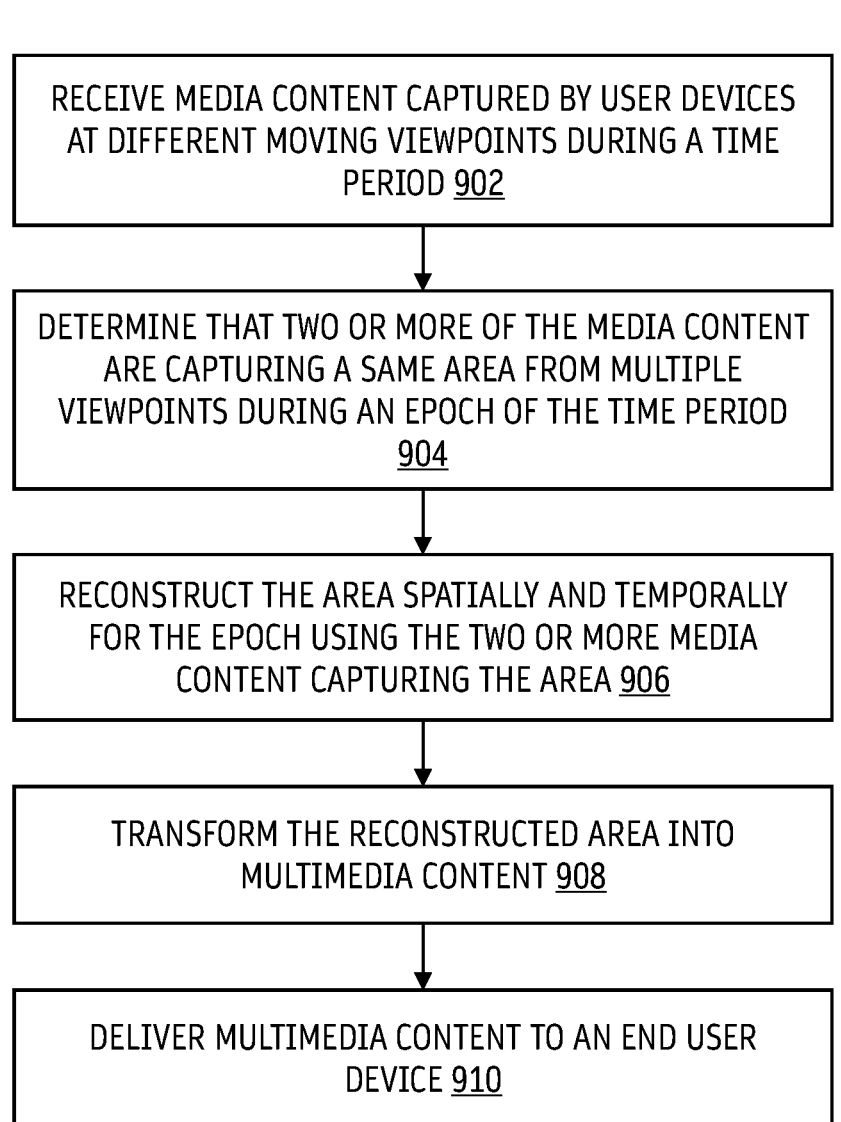

RECEIVE MEDIA CONTENT CAPTURED BY USER DEVICES AT DIFFERENT MOVING VIEWPOINTS DURING A TIME PERIOD <u>902</u>

DETERMINE THAT TWO OR MORE OF THE MEDIA CONTENT ARE CAPTURING A SAME AREA FROM MULTIPLE VIEWPOINTS DURING AN EPOCH OF THE TIME PERIOD <u>904</u>

RECONSTRUCT THE AREA SPATIALLY AND TEMPORALLY FOR THE EPOCH USING THE TWO OR MORE MEDIA CONTENT CAPTURING THE AREA <u>906</u>

TRANSFORM THE RECONSTRUCTED AREA INTO MULTIMEDIA CONTENT <u>908</u>

DELIVER MULTIMEDIA CONTENT TO AN END USER DEVICE <u>910</u>

FIGURE 9

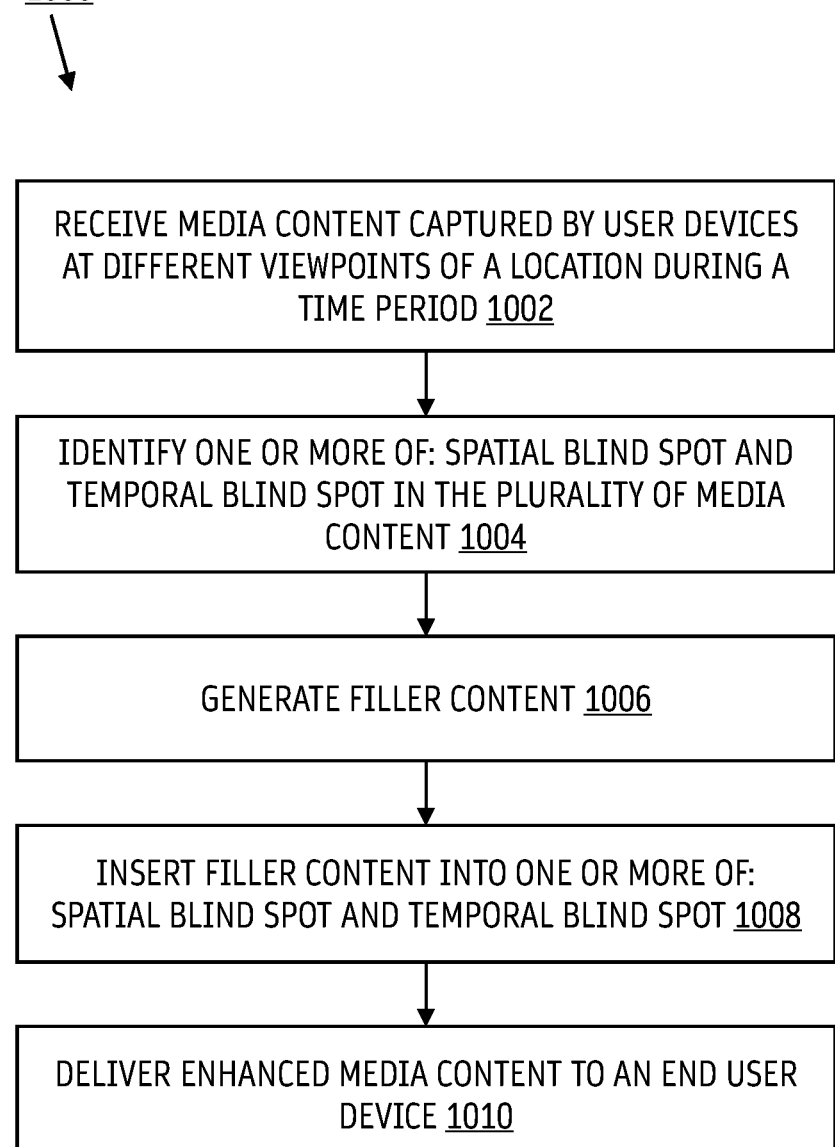

1000

RECEIVE MEDIA CONTENT CAPTURED BY USER DEVICES AT DIFFERENT VIEWPOINTS OF A LOCATION DURING A TIME PERIOD 1002

IDENTIFY ONE OR MORE OF: SPATIAL BLIND SPOT AND TEMPORAL BLIND SPOT IN THE PLURALITY OF MEDIA CONTENT 1004

GENERATE FILLER CONTENT 1006

INSERT FILLER CONTENT INTO ONE OR MORE OF: SPATIAL BLIND SPOT AND TEMPORAL BLIND SPOT 1008

DELIVER ENHANCED MEDIA CONTENT TO AN END USER DEVICE 1010

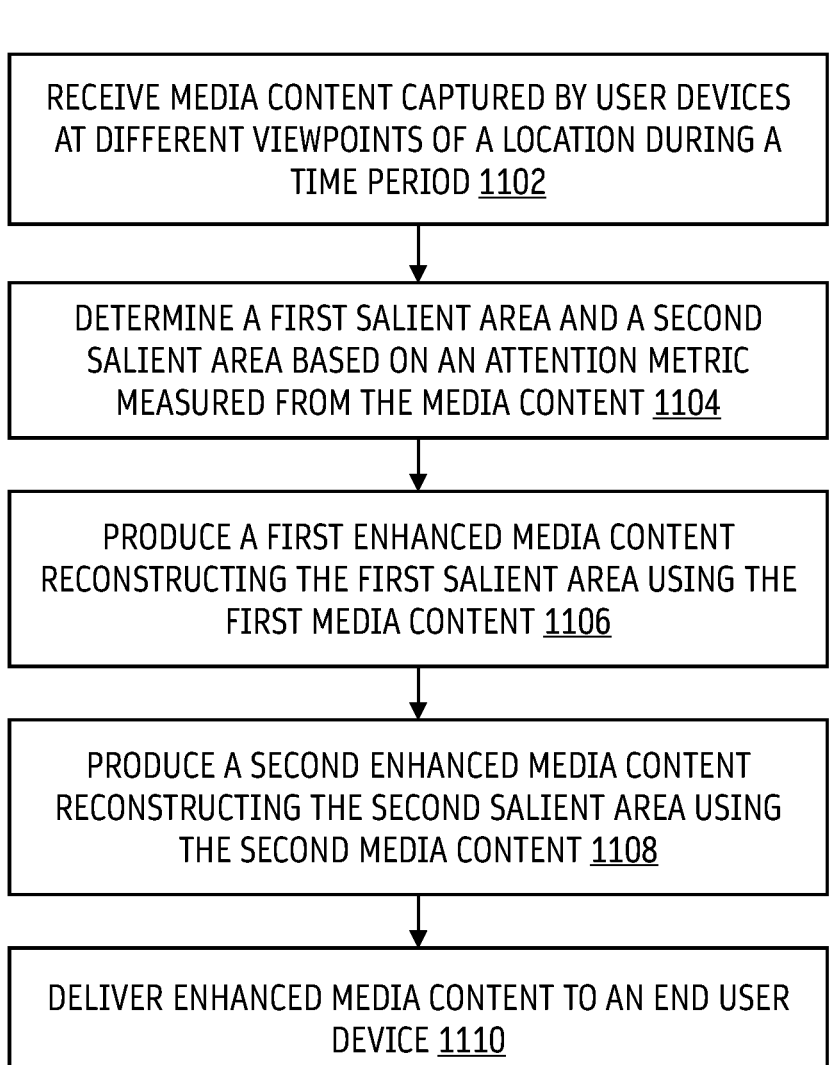

RECEIVE MEDIA CONTENT CAPTURED BY USER DEVICES AT DIFFERENT VIEWPOINTS OF A LOCATION DURING A TIME PERIOD 1102

DETERMINE A FIRST SALIENT AREA AND A SECOND SALIENT AREA BASED ON AN ATTENTION METRIC MEASURED FROM THE MEDIA CONTENT 1104

PRODUCE A FIRST ENHANCED MEDIA CONTENT RECONSTRUCTING THE FIRST SALIENT AREA USING THE FIRST MEDIA CONTENT 1106

PRODUCE A SECOND ENHANCED MEDIA CONTENT RECONSTRUCTING THE SECOND SALIENT AREA USING THE SECOND MEDIA CONTENT 1108

DELIVER ENHANCED MEDIA CONTENT TO AN END USER DEVICE 1110

FIGURE 11

PRODUCTION PLATFORM

TECHNICAL FIELD

This disclosure relates generally to multimedia systems, and more specifically, to techniques for content recommendation for individuals and groups in connection with such multimedia environments.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 6 illustrates an exemplary aggregation and analysis part, according to some embodiments of the disclosure.

FIG. 7 illustrates an exemplary content enhancement part, according to some embodiments of the disclosure.

FIG. 8 illustrates an exemplary content delivery part, according to some embodiments of the disclosure.

FIG. 9 illustrates a flow diagram of exemplary operations for delivering enhanced media content to some embodiments of the disclosure.

FIG. 10 illustrates a flow diagram of exemplary operations for delivering enhanced media content to some embodiments of the disclosure.

FIG. 11 illustrates a flow diagram of exemplary operations for delivering enhanced media content to some embodiments of the disclosure.

DETAILED DESCRIPTION

Overview

Figure 1:
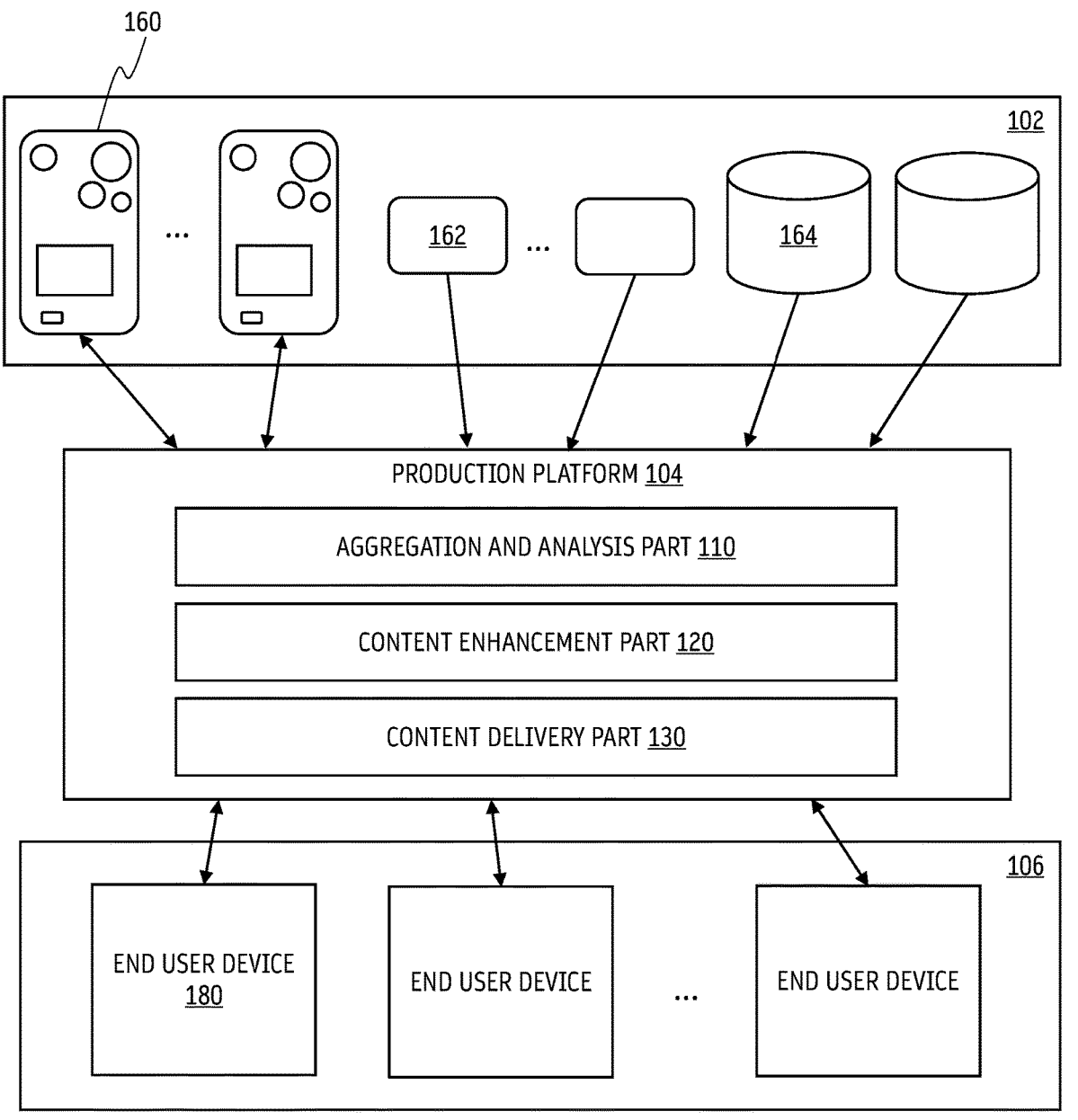
FIG. 1 illustrates a block diagram of exemplary input sources, an exemplary production platform, and exemplary content consumption user devices, according to some embodiments of the disclosure.

Camera equipment used for capturing a live event is expensive and may require professionals to operate the equipment. Often, camera equipment at sports events has strict requirements on the setup of the camera equipment and potentially coordinated movement of the camera equipment during the event at the location of the live event. If the media content is to be consumed by an end user using virtual reality headsets, and/or allowing 360 degrees angular field of view at a viewpoint, camera equipment having an array of cameras capturing every part of the 360 degrees angular field of view would be used. In some cases, camera equipment may be used to scan every part of the location to fully recreate a three-dimensional model of the location. Such camera equipment is not accessible for capturing events and experiences by everyday users.

Suppose media content of the live event is captured by lower-cost devices such as mobile phones with a video camera. In some cases, other types of devices such as microphones or consumer-level cameras may be placed on location to collect media content. In some cases, additional information about the live event may be available. Because the information coverage of the live event is likely limited, e.g., the media content may have spatial blind spots and/or temporal blind spots, the media content may have a limited field of view, etc., the technical challenge is to determine, with a given set of input sources, how much coverage the various input sources has of the live event, and determine one or more ways to enhance the media content so that one or more end users can view the media content and experience the live event in ways that are more than just viewing a live stream with a limited field of view from home.

An event or live event may have an associated time period (or time periods). An event may have a start time and an end time. A time period may have sub-time periods called epochs. An event may have a location (e.g., a geographical area or volume). The location can have a variety of viewpoints within the location. The location may be a venue. The location may be a general area and does not necessarily have boundaries. The location may be bounded or have boundaries. At least a part of the location may be outdoors. At least a part of the location may be indoors. At least a part of the location may be a mixed outdoors-indoors. Input sources may capture an event spatially and temporally. Examples of events may include one or more of: a life experience, a concert, a festival, running an errand, playing a game, visiting a museum, crafting, making a piece of artwork, renovating a home, a sports game or match, visiting a town, farming, going through a haunted house, and so forth.

Given a set of input sources, the media content may be enhanced so that end user devices can experience the live event from another location live or after the live event is over. The end user may also explore the timeline of the event through time shifting. The level and/or parameters of experiences may vary. A production platform may create an event model using the one or more input sources. The production platform can extract information for the event model from the one or more input sources. The event model can be spatial and temporal in nature. The event model may have spatial information describing a map of the event. The event model may have timeline information describing temporal information of the event. The one or more input sources can be limited in coverage spatially and/or temporally. Despite the limitations in the input sources, a production platform can produce enhanced media content based on the event model to recreate the experience of the event, spatially and temporally, for end user consumption.

Spatial and temporal information for the event model can be extracted from the input sources. Different input sources may offer one or more pieces of spatial and/or temporal information for the event model. Temporal information of an event model may be extracted from timestamped media content. Temporal information of an event model may be derived or inferred from the media content if timestamps are unavailable. Spatial information of an event model may be extracted from spatial information recorded with the media content (e.g., location coordinates may be tracked as media content is recorded). Spatial information of an event model may be derived or inferred from the media content if spatial information is not directly available with the media content.

In some embodiments, a production platform can use computer vision techniques and the event model to produce enhanced media content from media content captured by the lower-cost devices. In some embodiments, the production platform can aggregate and analyze the received media content to extract information for the event model and determine blind spots. Blind spots or the extent to which the coverage of the event is insufficient may depend on the level of experience to be achieved at the end user devices. The production platform can create or retrieve content based on the information extracted from the media content and insert the content in the blind spots. In some cases, multi-view areas can be identified, which may have sufficient information for at least partial spatial reconstruction of the area and enable rendering of the area from different or additional viewpoints. The level of enhancement, e.g., realism of the recreation or content, the number of additional viewpoints, may be selectable, configurable, and/or parameterizable. The level of enhancement may be limited by computing resources available for enhancing the media content.

In some embodiments, the production platform can generate feedback to improve the coverage of the event. Feedback can be provided during the event. Feedback can be provided after the event. Feedback can help the production platform better recreate the event model.

The production platform can deliver enhanced media content to an end user device for consumption. The enhanced media content can have the received media content and the inserted content. A wide range of end user devices may be used to consume the enhanced media content, and generation of enhanced media content may depend on the mode of consumption.

One exemplary application may include a user capturing video using a smart phone while walking through Paris. End user devices may follow the user in a virtual reality setting. End user devices may be able consume the video with a wider field of view than the field of view of the camera on the cell phone.

Another exemplary application may include a user capturing video using a smart phone while walking through a shopping mall. End user devices may follow the user in an augmented reality setting. End user devices may be able consume the video with a wider field of view than the field of view of the camera on the cell phone.

Another exemplary application may include several users capturing video using smart phones during a live concert. Users may include e.g., different band members, different attendees at various locations of the concert venue. Users may be roaming around. End user devices may be able to view the video from home with a wider field of view. End user devices may be able to experience the live concert in a virtual reality setting. End user devices may be able to experience the live concert from additional viewpoints in the concert venue.

Another exemplary application may include several users capturing video using smart phones during a soccer match. Users may include e.g., different spectators, a referee, different players, at various locations on the sports field. Users may be roaming around. End user devices may be able to view the video from home with a wider field of view. End user devices may be able to experience the soccer match in a mixed reality setting. End user devices may be able to experience the soccer match highlights or plays recreated from the limited video captured at the event.

Exemplary Multimedia System

FIG. 1 illustrates a block diagram of exemplary input sources 102, an exemplary production platform 104, and exemplary content consumption user devices 106, according to some embodiments of the disclosure.

Input sources 102 may provide content, such as media content and other data or information to production platform 104. Input sources 102 may represent various inputs for production platform 104. Examples of input sources 102 may include one or more of: a content capture user device, a content capture sensor, and a data source having media content and/or non-media content.

Figure 4:
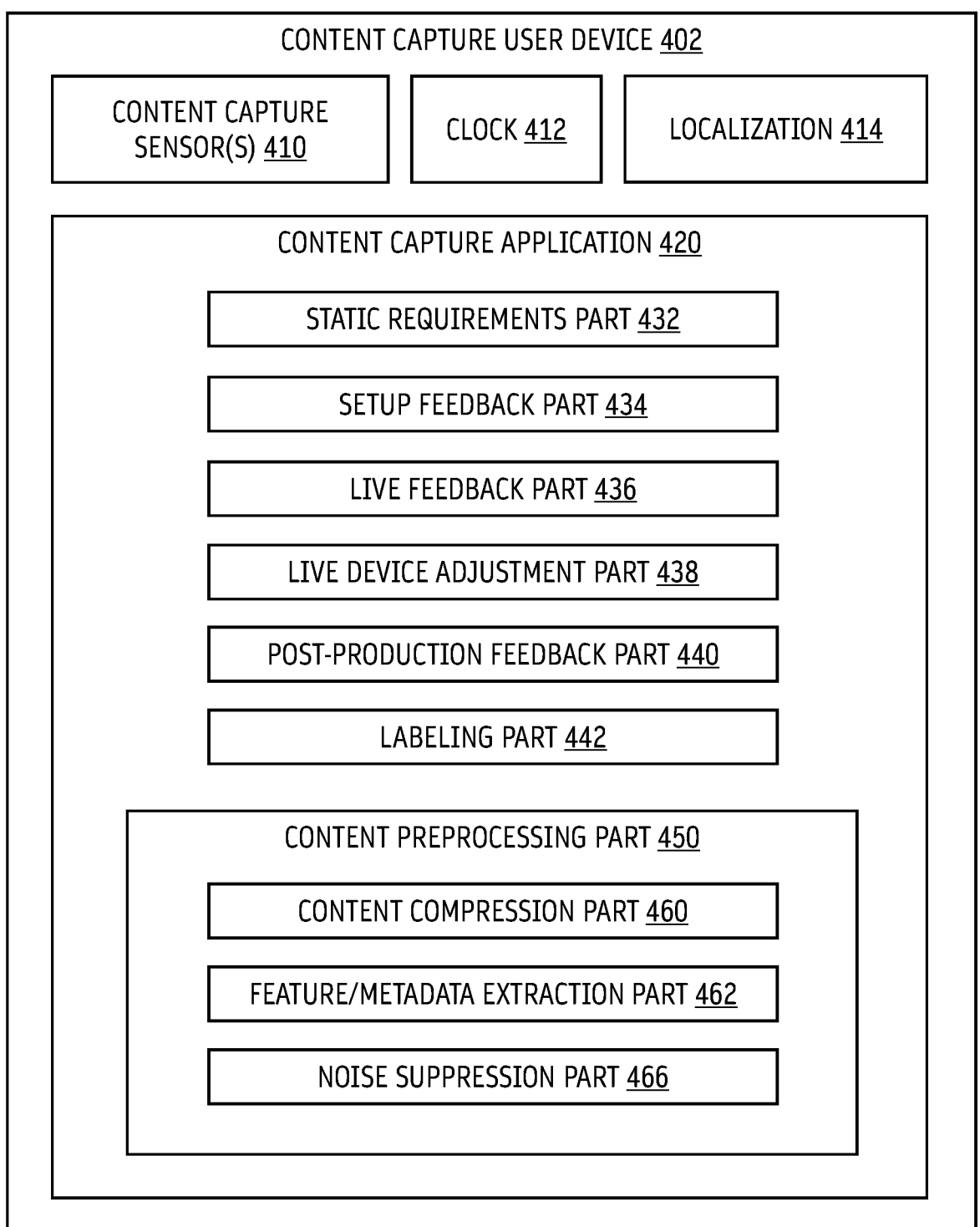
FIG. 4 illustrates an exemplary content capture user device, according to some embodiments of the disclosure.

One or more content capture user devices, such as content capture user device 160 may capture media content and optionally process the media content. A content capture user device may include one or more processors, one or more storage devices, and one or more content capture sensors. A content capture user device may be operable by a user, and the user may move the mobile computing device around. Examples of content capture user devices may include one or more of: a cell phone, a mobile phone, a smart phone, a laptop computer, a wearable user device (e.g., a smart watch, a head mounted display, smart eyeglasses, a necklace, etc.), a digital assistant, a handheld gaming console, a digital camera, a personal navigation device, a drone, a robot, etc. Detailed examples of a content capture user device are illustrated in FIG. 4.

One or more content capture sensors, such as content capture sensor 162 may capture media content. A content capture sensor may be installed at a fixed location. A content capture sensor may be movable/mobile to different locations. A content capture sensor may be rotatable. A content capture sensor may have an electro-mechanical or mechanical positioning system with a sensing part of the content capture sensor. Examples of content capture sensors may include one or more of: an imaging sensor, a detection and ranging sensor (e.g., light detection and ranging sensor, radio detection and ranging sensor, etc.), a time-of-flight sensor, a light sensor, a pressure sensor, a microphone, a microphone array, a vibrational sensor, a people counter, a temperature sensor, a humidity sensor, a chemical sensor, an electronic nose, a gas sensor, a capacitive sensor, an infrared sensor, a thermal sensor, a metal detector, an ultrasonic sensor, a gyroscope, an accelerometer, a color sensor, a flow sensor, a moisture sensor, a smoke sensor, a particle sensor, a proximity sensor, etc.

One or more data sources, such as data source 164, may have media content and/or non-media content. Data sources may include one or more of: Internet media content, media content warehouses, map information, geographical map information, building/floor plans, metadata of locations, three-dimensional assets, three-dimensional models, social media posts/content, metadata of events, timetable/schedule of events, summaries of events, historical information about locations, historical information about events, etc.

Given one or more input sources 102, production platform 104 may produce enhanced media content. Production platform 104 may include a pipeline of processes. The processes may be configured and/or parameterizable to produce a variety of experiences at the content consumption user devices 106. Production platform 104 may include aggregation and analysis part 110. Detailed examples of aggregation and analysis part 110 are illustrated in FIG. 6. Production platform may include content enhancement part 120. Detailed examples of a content enhancement part 120 are illustrated in FIG. 7. Production platform may include content delivery part 130. Detailed examples of content delivery part 130 are illustrated in FIG. 8.

Figure 5:
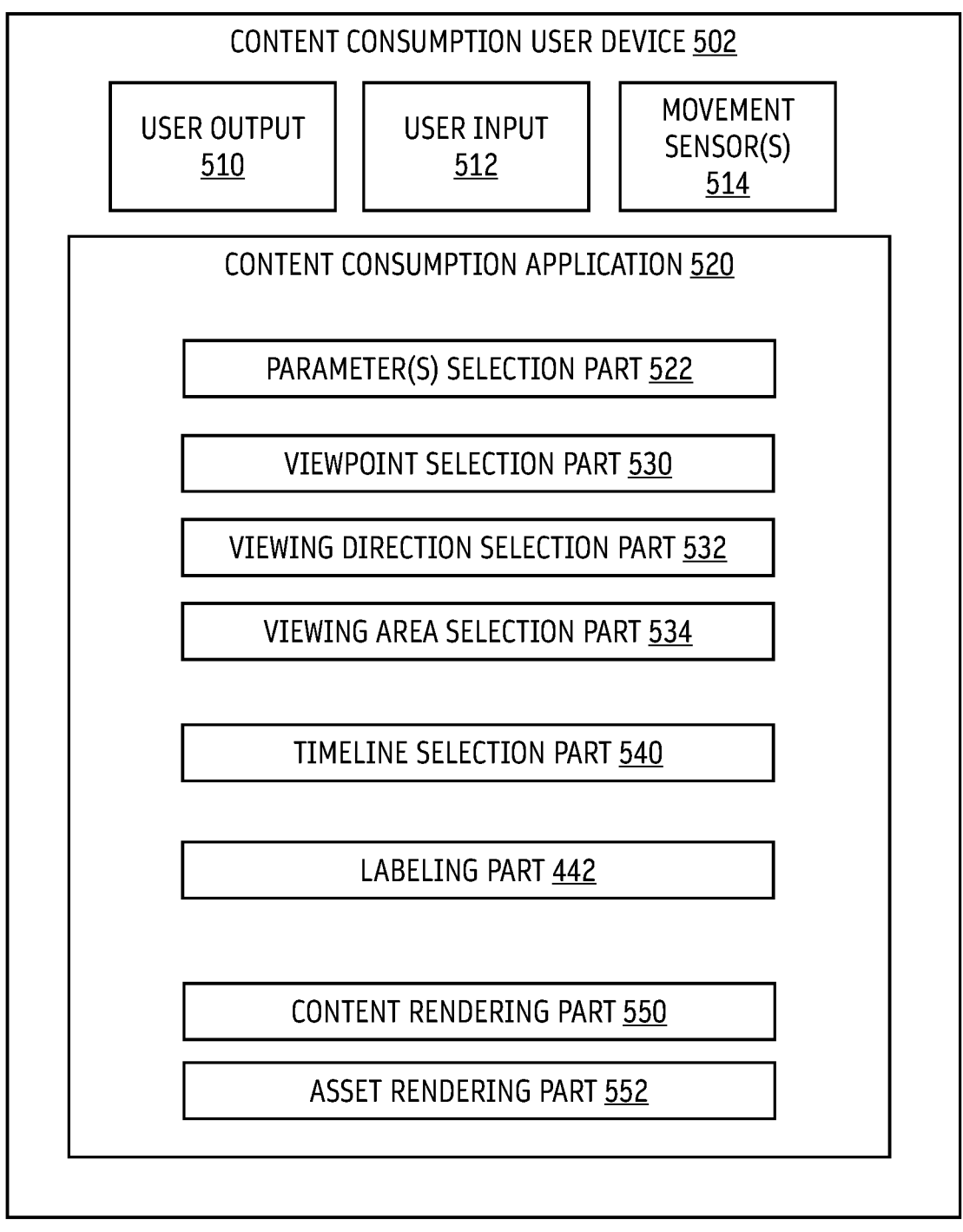
FIG. 5 illustrates an exemplary content consumption user device, according to some embodiments of the disclosure.

One or more content consumption user devices 106, such as end user device 180, can consume enhanced media content produced by production platform 104. Examples of content consumption user devices 106 may include one or more of: a two-dimensional display (e.g., a television with a remote control), a content output user device (e.g., a smart phone, a tablet, a desktop computer, a laptop computer, etc.), a virtual reality system, a mixed reality system, an augmented reality system, a haptic system, an immersive experience system, etc. Detailed examples of a content consumption user device are illustrated in FIG. 5.

Exemplary Events and Event Models

Figure 2:
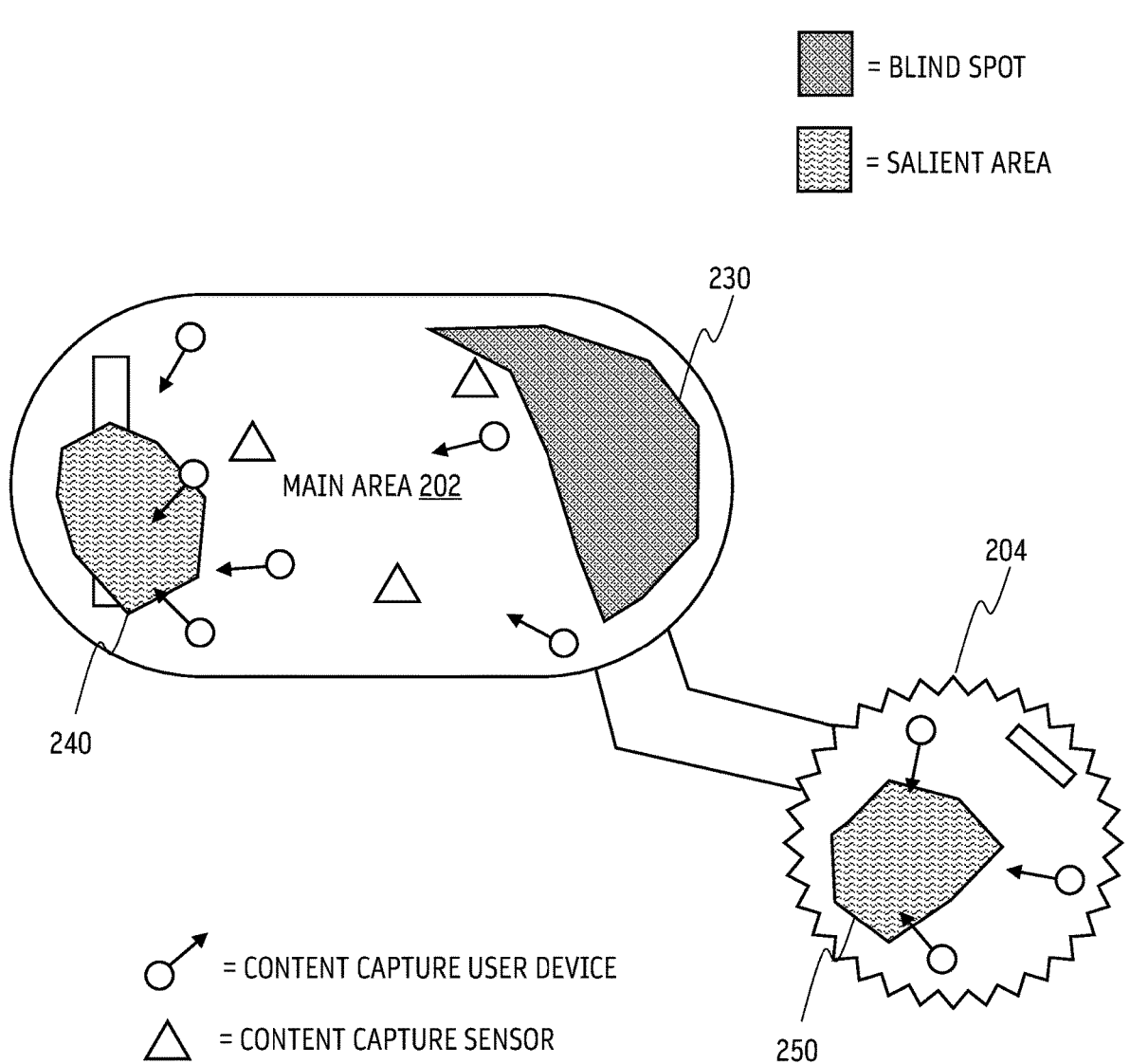
FIG. 2 illustrates an exemplary event at a mixed outdoor-indoor location, according to some embodiments of the disclosure.

FIG. 2 illustrates an exemplary event at a mixed outdoor-indoor location, according to some embodiments of the disclosure. The exemplary event may be held at a location having main area 202 (e.g., outdoor location) and tent area 204 (e.g., indoor location). Main area 202 may be an open-roof stadium. Tent area 204 may be a tent structure erected at a parking lot of the open-roof stadium. Content capture user devices, e.g., user-operated smart phones with cameras, may have different viewpoints within the location of the event. Content capture user devices may have moving viewpoints. A content capture user device may have associated heading (illustrated by an arrow). A content capture user device may have an associated field of view of an area of the location. Content capture user devices may have a limited angular field of view (e.g., not 360 degrees) from a given viewpoint. Content capture user device may have a limited field of view (e.g., area captured in the media content). Content capture user devices may not be capturing media content during the entire time period of the event. Content capture sensors (e.g., microphones) may be placed at different locations of main area 202. Spatial information and temporal information about the event may be extracted from media content captured by content capture user devices and/or content capture sensors.

From the spatial information and temporal information, a production platform may determine that the media content does not have complete coverage spatially or temporally of the event. For example, main area 202 may have a spatial blind spot 230 at a particular epoch of the time period of the event, e.g., where content capture user devices are not capturing media content that captures the spatial blind spot 230. In some cases, a production platform may suggest a viewpoint which can capture a determined spatial blind spot, and potentially reduce the size of the determined spatial blind spot. A production platform may generate filler content for insertion into a spatial blind spot and/or a temporal blind spot.

In some cases, from the spatial information and temporal information, a production platform may determine from the media content that there is multi-view coverage of a particular area in the location of the event during a particular epoch of the time period of the event. The production platform may infer that the multi-view area is a salient area, e.g., salient area 240 and salient area 250. The production platform may generate enhanced media content for the salient area using the media content capturing the salient area.

In some cases, a production platform may generate enhanced media content using content captured by content capture sensors. For example, the production platform may use audio recordings captured by content capture sensors for audio mixing at different viewpoints of the location selected by an end user. In some cases, a production platform may use a data source having information about the event to generate enhanced media content. The data source may include map information about the location. The data source may include a schedule or call sheet for the event. The data source may include images or videos of the location captured when no event or a different event is held at the location.

Figure 3:
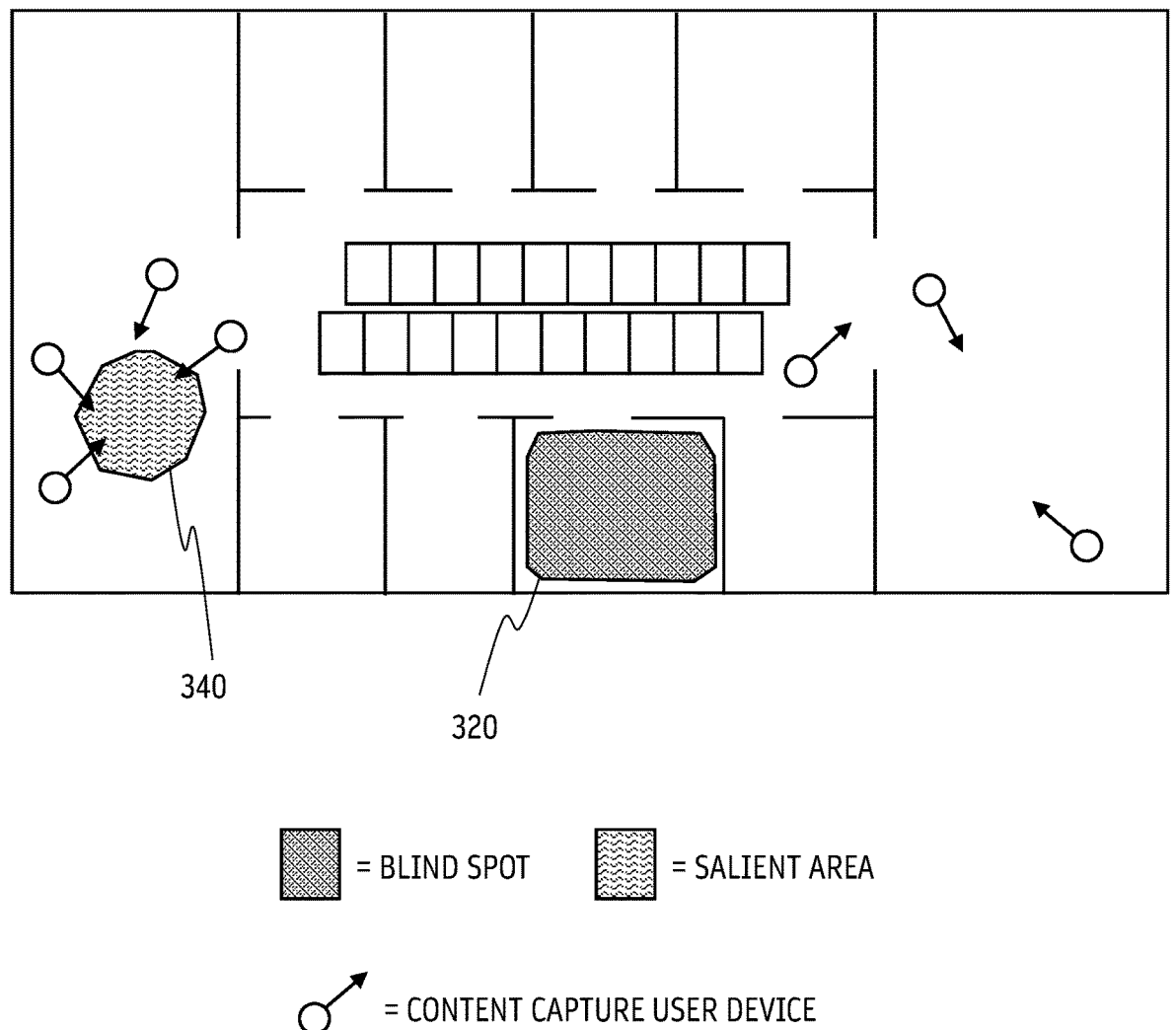
FIG. 3 illustrates an exemplary event at an indoor location, according to some embodiments of the disclosure.

FIG. 3 illustrates an exemplary event at an indoor location, according to some embodiments of the disclosure. The exemplary event may be held at a location having multiple floors (e.g., a single floor is depicted). The location may be an indoor shopping center having multiple floors. Content capture user devices, e.g., user-operated smart phones with cameras, may have different viewpoints within the location of the event. Content capture user devices may have moving viewpoints. A content capture user device may have associated heading (illustrated by an arrow). A content capture user device may have an associated field of view of an area of the location. Content capture user devices may have a limited angular field of view (e.g., not 360 degrees) from a given viewpoint. Content capture user device may have a limited field of view (e.g., area captured in the media content). Content capture user devices may not be capturing media content during the entire time period of the event. Spatial information and temporal information about the event may be extracted from media content captured by content capture user devices and/or content capture sensors.

From the spatial information and temporal information, a production platform may determine that the media content does not have complete coverage spatially or temporally of the event. For example, the floor within the location may have a spatial blind spot 320 at a particular epoch of the time period of the event, e.g., where content capture user devices are not capturing media content that captures the spatial blind spot 320. Spatial blind spot 320 may be an area where no content capture user devices captured the area at all during the entire time period of the event. A production platform may generate filler content for insertion into a spatial blind spot and/or a temporal blind spot.

In some cases, from the spatial information and temporal information, a production platform may determine from the media content that there is multi-view coverage of a particular area in the location of the event during a particular epoch of the time period of the event. The production platform may infer that the multi-view area is a salient area, e.g., salient area 340. The production platform may generate enhanced media content using the media content capturing the salient area.

In some cases, a production platform may use a data source having information about the event to generate enhanced media content. For example, the data source may include map information about the location (e.g., a store directory). The data source may include images or videos of the location captured when no event or a different event is held at the location.

Whether the location of the event is indoors or outdoors may impact how spatial information (e.g., location of viewpoint, field of view of viewpoint, heading/direction etc.) of content capture user devices can be determined or inferred. Content capture user devices in an outdoor area may record media content with spatial information, e.g., global positioning coordinates, local positioning coordinates determined by other triangulation techniques. Content capture user devices in an outdoor and/or indoor area may have associated spatial information determined using near field detection tracking and/or triangulation techniques. Content capture user devices may record media content with heading or field of view information, e.g., heading or direction information determined using a gyroscope or compass of the content capture user device. In some cases, spatial information of content capture user devices, thus spatial information corresponding to the media content being captured may be derived from the media content itself (e.g., based on objects or markers detected in the media content). or media content captured by other content capture user devices in the location.

Additional details about the production platform and how a production platform can create an event model for an event and generate the enhanced media content are described with FIGS. 6-8.

Exemplary Content Capture User Device and Content Consumption User Device

FIG. 4 illustrates an exemplary content capture user device 402, according to some embodiments of the disclosure. Content capture user device 402 may be an example of an input source 102 of FIG. 1. Content capture user device 402 may capture media content at a viewpoint or moving viewpoint during a time period of an event. Content capture user device 402 may be implemented as computing device 1200 of FIG. 12.

Content capture user device 402 may include one or more content capture sensors 410 to capture media content. Examples of content capture sensors are described with FIG. 1. One or more content capture sensors 410 may capture media content such as, e.g., audio content, images, panoramic images, videos, point clouds, depth images, thermal images, infrared images/videos, etc. Media content capturing an event may be spatial and temporal in nature. Media content may have spatial and temporal information that can be used by a production platform to recreate an event model.

In some cases, content capture sensors 410 may have different modalities and/or properties (e.g., angular field of view, field of view, fidelity, aperture, lens properties, etc.). Content capture sensors 410 may be selectable and/or controllable to capture certain media content in a particular modality with certain properties.

Content capture user device 402 may include clock 412 to record timing information, such as timestamps. The timing information may be recorded with the media content being captured by content capture sensors 410. Media content may be timestamped.

Content capture user device 402 may include localization 414 to record spatial information, such as location coordinates, heading/direction information of the content capture user device 402, identification of an area within the location (e.g., identifier of a room, identifier of stage, identifier of a shop in a shopping center, etc.). The spatial information may be recorded with the media content being captured by content capture sensors 410. The spatial information may be provided to the production platform. The spatial information may be tracked over time and coordinate with timestamped media content being captured by content capture sensors 410. Localization 414 may determine the position or location of content capture user device 402 in the location of the event. In some cases, localization 414 may use signals from cell phone towers to estimate the location of the content capture user device 402. In some cases, localization 414 may use global positioning system to estimate location of the content capture user device 402. In some cases, localization 414 may use a compass to estimate the heading/direction of the content capture user device 402. In some cases, localization 414 may use sensors (e.g., accelerometers, gyroscopes, motor sensors, detection and range sensors, etc.) to estimate position and orientation of content capture user device 402. In some cases, localization 414 may use indoor positioning techniques involving sensors and beacons (e.g., using Wi-Fi, Bluetooth, ultrasound signals, radio frequency tags, infrared signals, etc.) to estimate location of content capture user device 402 within an indoor or outdoor location. In some cases, localization 414 may use indoor positioning techniques, using sensors and a map of the location, to estimate location of content capture user device 402 within a location. In some cases, localization 414 may infer or derive the location of content capture user device 402 from the media content captured by content capture sensors 410 (e.g., detecting certain objects or markers in a video, detecting certain sounds in the audio, etc.). In some embodiments, content capture user device 402 does not include localization 414. In such cases, spatial information may be derived or inferred from the media content by the production platform.

Content capture user device 402 may include content capture user application 420. Content capture user application 420 may be an application that is communicably coupled to a production platform (e.g., production platform 104). Content capture user application 420 may assist in capturing media content.

Content capture application 420 may include static requirements part 432. Static requirements part 432 may offer a guide to a user using content capture user device 402 to capture the event. The guide may include one or more suggestions, such as:

whether to use a tripod or not, optimal viewpoints (e.g., viewpoint may include location and heading/direction, viewpoint may include a field of view), a minimum number of content capture sensors for the event and/or location, recommended content capture sensor(s) to use, request to complete a suggested calibration sequence, request to capture one or more panoramic images of the event and/or location, verify data connection quality and/or speed for uploading media content to the production platform, verify storage capacity for storing media content to be recorded for the event and/or location, request for a sample of media content, and recommended start time and end time for capturing media content for the event.

Content capture application 420 may include setup feedback part 434. Given information from localization 414 and/or (sample) media content, setup feedback part 434 may determine whether adjustment to the viewpoint of content capture user device 402 is desirable. Setup feedback part 434 may output feedback to a user using content capture user device 402 to adjust the setup of content capture user device 402, e.g., before the event begins.

Content capture application 420 may include live feedback part 436. In some cases, the production platform may determine feedback, during the time period of the event, that can improve the event model and/or the enhanced media content being produced by the production platform. Live feedback part 436 may receive the feedback from the production platform and output the feedback to a user using content capture user device 402, during the event, to adjust the setup of content capture user device 402. The feedback may include one or more suggestions such as:

whether a minimum number of content capture sensors for the event and/or location are active, whether to start capturing media content, whether to change content capture sensor(s), whether to use a different network to transmit media content to improve upload speed, and request to move to a different viewpoint.

Content capture application 420 may include live device adjustment part 438. In some cases, the production platform may determine feedback, during the time period of the event, that can improve the event model and/or the enhanced media content being produced by the production platform. Live device adjustment part 438 may receive the feedback from the production platform and make an adjustment to the content capture user device 402, during the event. The adjustment may include changing a field of view or angular field of view of content capture user device 402. The adjustment may include changing a location of the content capture user device 402 (e.g., adjusting a controllable positioning system of content capture user device 402). The adjustment may include changing a selection of content capture sensor(s) 410 being used for media capture. The adjustment may include changing settings of content capture sensor(s) 410 being used for media capture (e.g., resolution, fidelity, sensitivity, aperture, channel selection, exposure, focus, frame rate, shutter speed, white balance, increase/decrease lighting, flash mode, shooting mode, etc.).

Content capture application 420 may include post-production feedback part 440. In some cases, the production platform may determine feedback, e.g., after the event is over, that can improve the event model and/or the enhanced media content being produced by the production platform. Post-production feedback may receive the feedback from the production platform and output feedback to a user using content capture user device 402. The feedback may include one or more suggestions such as:

request to capture media content at one or more viewpoints, request to complete a suggested calibration sequence, request to capture media content of objects (e.g., animate objects and/or inanimate objects, foreground objects, background objects, etc.), and request to capture one or more panoramic images of the event and/or location.

Content capture application 420 may include labeling part 442. In some cases, the production platform may determine that the event model can benefit from human input, e.g., labels, responses, tags, etc. The human input or labels may improve the event model and/or the enhanced media content being produced by the production platform. Labeling part 442 may receive requests from the production platform and output the requests to a user using content capture user device 402. Through content capture application 420, the user may input labels (e.g., answer to questions). User input may be received by labeling part 442 and transmitted to the production platform. The requests may include one or more questions such as:

Does this media content correspond to this area in the location?

Does this media content correspond to this epoch of the event?

Who is this person in the media content?

Was this person/object present at the event?

What is the object in the media content?

What is happening in this media content?

Is something interesting happening in this media content?

What do you feel about this media content?

Does this look realistic to you?

Does this sound realistic to you?

What is the context of this media content?

Would you like to see more of this media content?

Would you like to see more media content in this area?

Would you like to see more media content during this epoch?

Is this related to this media content?

How would you rate this media content?

Can you tell me more about this event?

Is this summary of the event correct?

Would you recommend this content to a friend?

Content capture user application 420 may include media content processing to extract information from the media content and/or improve the media content captured by content capture user device 402. Content preprocessing part 450 may be included to process the media content. Content capture user device 402 having some media content preprocessing may assist the production process being performed by the production platform. In some cases, content capture user device 402 does not have content preprocessing, e.g., if computing resources are limited on the content capture user device 402.

Content capture application 420 may include content compression part 460. Content compression part may reduce the size of media content being captured by content capture sensor(s) 410 to facilitate transmission of the media content to the production platform. Content compression part 460 may transmit compressed media content to the production platform.

Content capture application 420 may include feature and/or metadata extraction part 462. Feature and/or metadata extraction part 462 may include one or more signal processing parts and/or machine learning models to extract features and/or metadata from the media content captured by content capture sensor(s) 410. Feature and/or metadata extraction part 462 may transmit data structures having features and/or metadata to the production platform. Features and/or metadata may include one or more of:

Frequency domain coefficients of audio,

Object detection information,

Object classification information,

People/face detection information,

Object attribute information,

Object tracking information (e.g., location of objects),

Image analysis information (e.g., edges, colors, shapes, foreground detection, background detection, etc.), Salient information/object detection information, Semantic analysis information (e.g., extracted speech including words, phrases, text, etc.), Contextual analysis information, Voice activity detection information, Summary analysis information, Feature vectors generated by a machine learning model, and Signal quality analysis information.

Content capture application 420 may include noise suppression part 466. Noise suppression part 466 may improve the quality of the media content being sent to the production platform. Noise suppression part 466 may reduce or eliminate unwanted noise from the media content being captured by content capture sensor(s) 410. Noise suppression part 466 may strengthen salient information while suppressing non-salient information in the media content. Noise suppression part 466 may remove background noise in the media content.

FIG. 5 illustrates an exemplary content consumption user device 502, according to some embodiments of the disclosure. Content consumption user device 502 may be an example of content consumption user devices 106 of FIG. 1. Content consumption user device 402 may be an end user device that can consume enhanced media content produced by the production platform 104 of FIG. 1. Content consumption user device 502 may be implemented as computing device 1200 of FIG. 12.

Content consumption user device 502 may include user output 510. Examples of user output 510 may include examples described with display device 1206, audio output device 1208, and other output device 1210 of FIG. 12. User output 510 may include a display device. User output 510 may include a projection device. User output 510 may include a stereoscopic display device.

Content consumption user device 502 may include user input 512. Examples of user input 512 may include examples described with audio input device 1218 and other input device 1220 of FIG. 12.

Content consumption user device 502 may include movement sensor(s) 514. Movement sensor(s) 514 may track movement of content consumption user device 502. Movement sensor(s) 514 may be included for content consumption user device 502 supporting, e.g., virtual reality, mixed reality, and augmented reality.

In some cases, content consumption user device 502 may include a content consumption application 520. Content consumption application 520 may output enhanced media content for a user using content consumption user device 502 to consume media content. Content consumption application 520 may receive input from the user specifying the level of experience for the event. Content consumption application 520 may receive input from the user specifying a manner to consume the enhanced media content.

Content consumption application 520 may include parameter(s) selection part 522. Parameter(s) selection part 522 may output options for one or more parameters for the user of content consumption user device 502. The one or more parameters may include different degrees of freedom for generating enhanced media content. Parameter(s) selection part 522 may receive user input selecting or specifying an option for a parameter and provide the user input to the production platform. The production platform may take the user input and generate enhanced media content based on the user input. Parameters may include one or more of:

Level of enhancement of the media content,
Degree of realistic spatial and/or temporal recreation of the event,
Types of augmented reality content,
Whether augmented reality content is desired,
Types of artificially generated content,
Whether artificially generated content is desired,
Types of revenue-generating content,
Whether revenue-generating content is desired,
Fidelity of the event model,
Fidelity of enhanced media content to be produced,
Whether to cartoonify people in the event or use avatars,
Parental settings,
Language settings,
Frame rate,
Fixed/preset viewpoint(s) or arbitrary/unlimited viewpoints of the event,
Angular field of view,
Size of field of view,
Whether a two-dimensional, three-dimensional spatial experience is desired,
Whether a four-dimensional spatial and temporal experience is desired,
Whether an immersive experience is desired,
Whether only salient/interesting/focused information/areas are desired, Whether to consume the enhanced media content live or almost live,
Whether to consume the enhanced media content with time shifting capabilities, and
Whether to consume the enhanced media content after the event has occurred.

Content consumption application 520 may include viewpoint selection part 530. Viewpoint selection part 530 may output viewpoint options for a user using content consumption user device 502 to select a desired viewpoint. The viewpoint options may be presented on a map. The viewpoint options may be presented as a list. Viewpoint selection part 530 may receive a selection from the user and provide the selection to the production platform to cause suitable enhanced media content to be delivered to the content consumption user device 502. Viewpoint selection part 530 may receive a selection from the user and select suitable enhanced media content to be output to the user using content consumption user device 502. Viewpoint selection part 530 may receive a selection from the user and render suitable enhanced media content to be output to the user using content consumption user device 502. The user may virtually teleport to the selected viewpoint to view enhanced media content.

Content consumption application 520 may include viewing direction selection part 532. Viewing direction selection part 532 may implement user interface features to allow a user using content consumption user device 502 to select a desired viewing direction (e.g., allowing a user to pan to a different direction). Viewing direction selection part 532 may receive user input indicating a desired viewing direction and provide the user input to the production platform to cause suitable enhanced media content to be delivered to the content consumption user device 502. Viewing direction selection part 532 may receive user input indicating a desired viewing direction and select suitable enhanced media content to be output to the user using content consumption user device 502. Viewing direction selection part 532 may receive user input indicating a desired viewing direction and render suitable enhanced media content to be output to the user using content consumption user device 502. The user may virtually look around a viewpoint.

Content consumption application 520 may include viewing area selection part 534. Viewing area selection part 534 may implement user interface features to allow a user using content consumption user device 502 to select a desired viewing area, potentially from a plurality of viewing areas (e.g., allowing a user to teleport to view a selected area of an event). One or more viewing areas may be presented on a map. The one or more viewing areas may be presented as a list. Viewing area selection part 534 may receive a selection from the user and provide the selection to the production platform to cause suitable enhanced media content to be delivered to the content consumption user device 502. Viewing area selection part 534 may receive a selection from the user and select suitable enhanced media content to be output to the user using content consumption user device 502. Viewing area selection part 534 may receive a selection from the user and render suitable enhanced media content to be output to the user using content consumption user device 502. The user may virtually teleport to view enhanced media content capturing a selected viewing area.

Content consumption application 520 may include timeline selection part 540. Timeline selection part 540 may implement user interface features to allow a user using content consumption user device 502 to select a desired epoch or time instant of a timeline corresponding to the enhanced media content (e.g., allowing a user to pause, go forward, and/or go back in time of the event). One or more epochs may be presented on a timeline. The one or more epochs may be presented as a list. In some cases, timeline selection part 540 may implement user interface features to allow a user using content consumption user device 502 to select a desired chapter of a story corresponding to the enhanced media content (e.g., allowing a user to virtually experience different parts of the story corresponding to the event). One or more chapters may be presented on a timeline. One or more chapters may be presented as areas on a map of the location of the event. Timeline selection part 540 may receive a selection from the user and provide the selection to the production platform to cause suitable enhanced media content to be delivered to the content consumption user device 502. Timeline selection part 540 may receive a selection from the user and select suitable enhanced media content to be output to the user using content consumption user device 502. Timeline selection part 540 may receive a selection from the user and render suitable enhanced media content to be output to the user using content consumption user device 502. The user may virtually time travel within the event. The user may virtually experience selected chapter(s) of a story corresponding to the event.

Content consumption application 520 may include labeling part 442 (as described with FIG. 4) to obtain human input, e.g., labels or feedback.

Content consumption application 520 may include content rendering part 550. Content rendering part 550 may receive enhanced media content from a production platform and render the enhanced media content for output to a user using content consumption user device 502. The rendering may be performed according to the one or more modalities of the user output 510.

Content consumption application 520 may include asset rendering part 552. Asset rendering part 552 may receive enhanced media content having three-dimensional assets and/or four-dimensional assets from a production platform. Asset rendering part 552 may render the enhanced media content for output to a user using content consumption user device 502, e.g., using graphics techniques such as ray tracing, texturing, illumination, shading, physics simulation, audio mixing, and animation. Asset rendering part 552 may convert the assets into two-dimensional images which can be output to a user using content consumption user device 502 via user output 510. In some embodiments, asset rendering part 552 may render assets for output to a user using content consumption user device 502 via user output 510 based on information from movement sensor(s) 514 and/or user input received via user input 512 for virtual reality, augmented reality, and/or mixed reality experience.

In some embodiments, content capture user device 402 may include functionalities of content consumption user device 502. In some embodiments, content consumption user device 502 may have functionalities of content capture user device 402

Exemplary Aggregation and Analysis Part of a Production Platform

FIG. 6 illustrates an exemplary aggregation and analysis part 110, according to some embodiments of the disclosure. Aggregation and analysis part 110 may generate an event model about the event based on received media content and/or other data from various input sources (e.g., input sources 102 of FIG. 1).

Aggregation and analysis part 110 may include spatial analysis part 602. Spatial analysis part 602 may analyze received media content from various input sources and determine spatial information for the event model. Spatial analysis part 602 may create the event model by correlating spatial information in the received media content with a map of the location of the event. Spatial analysis part 602 may determine spatial coverage of the received media content. Spatial analysis part 602 may determine field of view of the media content (e.g., derived from location information recorded with the media content and/or location information tracked by the content capture user device) relative to a map of the location of the event and identify areas of the location which was captured in the received media content.

Aggregation and analysis part 110 may include temporal analysis part 604. Temporal analysis part 604 may analyze received media content from various input sources and determine temporal information for the event model. Temporal analysis part 604 may create the event model by correlating temporal information in the received media content with a timeline of the event. Temporal analysis part 604 may determine temporal coverage of the received media content. Temporal analysis part 604 may determine and/or identify which epoch(s) of the time period of the event during which the received media content was captured based on timestamps of the received media content.

Aggregation and analysis part 110 may include device extracted information analysis part 684. In some cases, a content capture user device may extract features and/or metadata about the media content. Device extracted information analysis part 684 may receive and aggregate the features and/or metadata. Device extracted information analysis part 684 may use received features and/or metadata to create the event model (e.g., to better understand or perceive the event, to better produce spatial information and/or temporal information of the event model, to tag or add attributes to the spatial information and/or temporal information of event model). One or more received features and/or metadata may be added to an event model.

Aggregation and analysis part 110 may include multi-view area determination part 610. A multi-view area is an area of a location of an event captured by media content from different viewpoints during an epoch of the time period of the event. The area may be captured from different angles by different input sources. The field of views of the different input sources may overlap in space during the epoch. A multi-view area may exist spatially within the event and temporally during the event. Multi-view area determination part 610 may analyze received media content from various input sources and determine one or more areas where field of views associated with the media content may overlap. Multi-view area determination part 610 may identify multi-view areas by correlating spatial information in the received media content with a map of the location of the event. Multi-view area determination part 610 may correlate different media content captured during an epoch and identify whether the content (e.g., objects, people, sounds, etc.) overlap. In some embodiments, multi-view area determination part 610 may determine that two or more of the received media content are capturing the same area from multiple viewpoints during a time period. The determination may be based on information and field of view information associated with the plurality of media content. The determination may be based on based on a common detection of one or more objects captured in the two or more of the media content. One or more multi-view areas may be added to an event model.

Aggregation and analysis part 110 may include salient area determination part 612. A salient area may be an area of a location of an event meeting one or more saliency criteria. Data from one or more input sources may indicate that an area is salient because of a scheduled subevent or incident of an event. Received media content and features and/or metadata extracted from the media content (e.g., detection of loud sounds, detection of high activity, detection of saliency, detection of a number of salient objects, etc.) may indicate that an area is salient. A salient area may be an area of a location of an event meeting an attention metric. An attention metric may be measured based on a number of content capture user devices capturing an area, and whether the number crosses a threshold. An attention metric may be measured based on a popularity of the media content being consumed by content consumption user devices (e.g., a number of content consumption user devices viewing the media content capturing the area for a given epoch and whether the number crosses a threshold). The attention metric may be based on a number of users streaming media content capturing the given area for a given epoch. A salient area may be a special case of a multi-view area. Salient area determination part 612 may analyze the received media content, one or more saliency criteria, and/or one or more attention metrics to determine one or more salient areas of a location of an event. A salient area may exist spatially within the event and temporally during the event. A salient area may have a corresponding epoch of the time period during which the media content capture the salient area. One or more salient areas may be added to an event model.

Aggregation and analysis part 110 may include spatial blind spot determination part 614. Spatial blind spot determination part 614 may leverage information determined in spatial analysis part 602 to determine one or more areas, referred to herein as spatial blind spots, which was not captured by one or more input sources during an epoch of a time period of an event. A spatial blind spot may exist spatially within the event and temporally during the event. Spatial blind spot determination part 614 may determine one or more areas captured by the plurality of user devices at the different viewpoints at an epoch of the time period, and determine one or more areas not captured by the plurality of user devices at the different viewpoints during the first epoch based on map of the location and the one or more areas captured by the plurality of user devices. The spatial blind spot can correspond to an area not captured by the plurality of user devices during the first epoch. One or more spatial blind spots may be added to an event model.

Aggregation and analysis part 110 may include temporal blind spot determination part 616. Temporal blind spot determination part 616 may leverage information determined in temporal analysis part 604 to determine one or more epochs, referred to herein as temporal blind spots, which was not captured by any input sources during an epoch of time period of an event. Temporal blind spot determination part 616 may determine one or more first epochs of the time period during which the plurality of user devices are capturing the plurality of media content, and determine one or more second epochs of the time period during which no user devices are capturing the plurality of media content based on a timeline of the time period and the one or more first epochs. The temporal blind spot corresponds to a second epoch. One or more temporal blind spots may be added to an event model.

Aggregation and analysis part 110 may include feedback generation part 620. Various parts of aggregation and analysis part 110 may contribute to the creation of an event model. Feedback generation part 620 may analyze the event model to determine whether changes in viewpoints, improvements to viewpoints, additional media content, additional data about the event, and/or human input can improve the completeness, coverage, and/or accuracy of the event model of the event. Improvements to the event model may include one or more of: more coverage of the background of the location, more coverage of objects/people at the event, more multi-view areas, increase number of multi-view areas, decrease spatial blind spots, higher confidence of spatial information, higher confidence of salient areas, etc.). Feedback generation part 620 may generate feedback or request for human input based on the event model (e.g., the completeness, coverage, and/or accuracy of the event model), and transmit the feedback to a content capture user device (e.g., content capture user device 402). The feedback or request for human input can be used by one or more of: static requirements part 432, setup feedback part 434, live feedback part 436, live device adjustment part 438, post-production feedback part 440, and labeling part 442.

In some embodiments, feedback generation part 620 may determine an improved viewpoint in the location different from one of the different viewpoints at which received media content was captured that would at least reduce a size of the spatial blind spot. Feedback generation part 620 may transmit a message to a content capture user device suggesting to a user operating the content capture user device to capture content at the improved viewpoint. Content captured at the improved viewpoint can be used for content enhancement by content enhancement part 120 of FIG. 1, e.g., generating filler content.

In some embodiments, feedback generation part 620 may determine a follow-up viewpoint in the location capturing at least a part of the spatial blind spot of an event. After the time period, feedback generation part 620 may cause transmit a message to a content capture user device suggesting to a user operating the content capture user device to capture content at the follow-up viewpoint capturing the at least part of the spatial blind spot. Content captured at the follow-up viewpoint can be used for content enhancement by content enhancement part 120 of FIG. 1, e.g., generating filler content.

Aggregation and analysis part 110 may include assets extraction part 632. Assets extraction part 632 may add three-dimensional and/or four-dimensional assets to the event model. Three-dimensional assets may include three-dimensional models of objects of the event. Four-dimensional assets may include three-dimensional models with an additional dimension, e.g., time or movement over time. Four-dimensional assets may include three-dimensional spatial information (modeling/describing/specifying an object within three-dimensional space) and temporal information (modeling/describing/specifying an object's movement or dynamics over time). Three-dimensional assets and/or four-dimensional assets may include three-dimensional meshes with optional textures to the meshes. Three-dimensional assets and/or four-dimensional assets may include attribute (s) about the objects that the assets represent. Assets extraction part 632 may analyze the received media content and/or data from input sources and extract three-dimensional and/or four-dimensional assets. Extracted assets may be used for reconstructing (spatially and temporally) an area of the location of an event. Extracted assets may be added to the event model. Examples of three-dimensional assets and/or four-dimensional assets may include one or more of:

A model of a player (person) in a game,

A model of an inanimate object in the event,

A model of a ball in a game,

A model of a background of an event,

A model of a background object of an event,

A model of an animal in an event,

A model of an audience member of a concert,

A model of the location, and

A model of a band member of a festival.

Aggregation and analysis part 110 may include features and/or metadata extraction part 462 (as described in FIG. 4) to extract features and/or metadata from received media content. When implemented in the production platform, features and/or metadata extraction part 462 may benefit from additional information from a variety of input sources (as opposed to just the captured media content on the content capture user device). When implemented in the production platform, features and/or metadata extraction part 462 may benefit from having more computing resources available in the production platform.

Aggregation and analysis part 110 may include authenticity verification part 680. Authenticity verification part 680 may verify that media content from input sources are capturing an event that the input sources purports to be capturing. Authenticity verification part 680 may verify authenticity of the media content from the input sources based on spatial information recorded with the media content. Authenticity verification part 680 may verify authenticity of the media content by detecting signatures (e.g., objects unique to the location or the event) in the media content.

Exemplary Content Enhancement Part of a Production Platform

FIG. 7 illustrates an exemplary content enhancement part 120, according to some embodiments of the disclosure. Content enhancement part 120 may generate enhanced media content based on the event model (e.g., using information extracted by aggregation and analysis part 110). FIG. 7 depicts one or more possible ways that media content can be enhanced. Enhancement may occur through improvement, transformation, and/or augmentation of the received media content. Enhancement may occur through insertion of filler content in blind spots. Enhancement may occur through recreation of a story based on the event model and salient areas of the event. Enhancement may occur through rendering of extracted assets.

Content enhancement part 120 may include content replacement part 702. Content replacement part 702 may detect specific or undesirable content in the received media content, and selectively remove the specific or undesirable content. Content replacement part 702 may generate replacement content to be inserted in place of the removed content. Content replacement part 702 may be used to remove inappropriate content and replace with appropriate content. Content replacement part 702 may be used to remove unwanted content and replace with targeted content. Content replacement part 702 may be used to remove private content (e.g., faces, license plates, etc.) and replace with generic content. Content replacement part 702 may be used to remove commercial content (e.g., brand names, advertisements, specific revenue-generating content, etc.) and replace with generic, non-commercial content. Content replacement part 702 may be used for censorship. Content replacement part 702 may be used to make corrections and/or alterations to the received media content.

Content enhancement part 120 may include transcription part 704. Transcription part 704 may extract speech and/or contextual description from the received media content. Transcription part 704 may extract closed captioning text from the received media content. Transcription part 704 may extract natural language text from the received media content.

Content enhancement part 120 may include language translation part 706. Language translation part 706 may translate speech, contextual description, and/or closed captioning text from transcription part 704 into a different language. Language translation part 706 may generate speech in a different language and replace the speech in the received media content.

Content enhancement part 120 may include content insertion part 712. Content insertion part 712 may retrieve content, such as content targeted to a user of a content consumption user device receiving enhanced media content, revenue-generating content, content associated with the event captured by the media content, content associated with information in the event model of the event, and content associated with features and/or metadata extracted from the media content, content from an input source, etc. Content insertion part 712 may use information in the event model to retrieve content associated with the event. Content insertion part 712 may retrieve one or more images of the location (e.g., background). Retrieved content may be referred to as filler content. Content insertion part 712 may generate filler content and insert the filler content into one or more of a spatial blind spot and a temporal blind spot determined by aggregation and analysis part 110.

Content enhancement part 120 may include contextual content insertion part 714. Contextual content insertion part 714 may determine one or more contextual cues of an event captured by the received media content. Contextual content insertion part 714 may determine one or more contextual cues of an area captured the plurality of user devices adjacent to a spatial blind spot. Contextual content insertion part 714 may determine one or more contextual cues of an epoch during which the plurality of user devices are capturing the plurality of media content adjacent to the temporal blind spot. Contextual content insertion part 714 may determine one or more contextual cues from one or more detected objects of an area captured the plurality of user devices adjacent to the spatial blind spot. Contextual content insertion part 714 may determine one or more contextual cues from one or more detected objects of an epoch during which the plurality of user devices are capturing the plurality of media content adjacent to the temporal blind spot. Contextual content insertion part 714 may determine one or more contextual cues of salient area. Contextual content insertion part 714 may create content based on the one or more contextual cues. The content may be referred to as filler content. One or more contextual cues may be extracted from the received media content. One or more contextual cues may be determined from features and/or metadata extracted from the media content. One or more contextual cues may be determined from information received from an input source.

Content enhancement part 120 may include artificial content generation and insertion part 716. Artificial content generation and insertion part 716 may generate content using one or more generative machine learning models and/or computer vision techniques. Artificial content generation and insertion part 716 may receive input information and generate artificial content based on the input information. Artificial content generation and insertion part 716 may generate artificial content by rendering one or more three-dimensional assets and/or one or more four-dimensional assets (e.g., assets representing objects, assets representing the location or the background) extracted by aggregation and analysis part 110. The rendering may render assets according to a user-selected theme. Artificial content generation and insertion part 716 may receive one or more images of the location and create/generate artificial content based on the one or more images of the location. Artificial content generation and insertion part 716 may receive information about incidents of an event and create/generate artificial content based on the information about the incidents. Incidents may include a schedule or timetable of an event. Incidents may include play-by-play summaries of a sporting match. Artificial content may be referred to as filler content. Artificial content generation and insertion part 716 may generate filler content and insert the filler content into one or more of a spatial blind spot and a temporal blind spot determined by aggregation and analysis part 110.

Content enhancement part 120 may include viewpoint transformation part 718. Some received media content may be captured from a particular viewpoint. Viewpoint transformation part 718 may implement neural radiance fields to generate media content with new viewpoints from received media content. Viewpoint transformation part 718 may extract volume information from the received media content and use volume rendering to project the volume information into two-dimensional images from different viewpoints. Viewpoint transformation part 718 may determine a multi-view area, where two or more of the media content may be capturing a same area from multiple viewpoints during an epoch of the time period. Viewpoint transformation part 718 may reconstruct the area spatially and temporally for the epoch using the two or more media content capturing the area. Reconstruction may include estimating volumetric information about the foreground objects and the background of the area from the two or more media content. Reconstruction may include extracting one or more of three-dimensional assets and/or one or more of four-dimensional assets. Reconstruction may include extracting one or more of three-dimensional assets and/or one or more of four-dimensional assets from a multi-view area and/or a salient area, using media content capturing the multi-view area and/or the salient area. Viewpoint transformation part 718 may determine a viewpoint of the area, e.g., a viewpoint that has sufficient information about the area, a viewpoint that captures the most information about the area, or a viewpoint that captures the most salient information about the area. Viewpoint transformation part 718 may render one or more of three-dimensional assets and/or one or more of four-dimensional assets into two-dimensional images viewing the assets from the determined viewpoint.

Content enhancement part 120 may include story stitching part 720. Story stitching part 720 may arrange and/or package enhanced media content generated by one or more parts of content enhancement part 120 according to time and space. Enhanced media content occurring earlier in time (e.g., associated with earlier epochs) may be arranged before enhanced media content occurring later in time (e.g., associated with later epochs). Generated filler content that is inserted in a spatial blind spot may be arranged based on temporal information associated with the spatial blind spot. Generated filler content that is inserted in a temporal blind spot may be arranged based on temporal information associated with the temporal blind spot. The arrangement of enhanced media content may form chapters of a story. The arrangement of enhanced media content may be based on the event model created by aggregation and analysis part 110. The event model may have a timeline of the time period of the event. The event model may have a map of the location of the event. A first chapter (e.g., a multi-view area or a salient area) that occurred during a first epoch in a first area may be linked to the first epoch in the timeline and to the first area on the map. A second chapter (e.g., a different multi-view area or a different salient area) that occurred during a second epoch in a second area may be linked to the second epoch in the timeline and to the second area on the map. The first epoch may be the same as the second epoch. The first epoch may be different from the second epoch. The first epoch may overlap with the second epoch. The first area may be the same as the second area. The first area may be different from the second area. The first area may overlap with the second area.

Content enhancement part 120 may include downsample or compress content part 734. Downsample or compress content part 734 may reduce the size of the enhanced media content to facilitate delivery of the enhanced media content through data compression. Downsample or compress content part 734 may increase fidelity of salient information in the enhanced media content and decrease fidelity of non-salient information in the enhanced media content.

Content enhancement part 120 may include audio mixing part 736. When a viewpoint is transformed, e.g., by viewpoint transformation part 718, audio may be mixed to sound like what the audio would sound like at the new viewpoint. Audio may be mixed using one or more audio components of media content capturing the area. Audio may be mixed using audio recordings from microphones located in the location, such as microphones near the viewpoint. Audio may be mixed or processed based on acoustic conditions of the viewpoint within the location (e.g., reverb, delay, volume, distortion, etc.). Mixed audio may be included as part of enhanced media content being created by content enhancement part 120.

Exemplary Content Delivery Part of a Production Platform

FIG. 8 illustrates an exemplary content delivery part 130, according to some embodiments of the disclosure. Content delivery part 130 may deliver enhanced media content to one or more content consumption user devices (e.g., content consumption user devices 106 of FIG. 1). Content delivery part 130 may deliver enhanced media content and inserted filler content. Content delivery part 130 may package enhanced media content with information from the event model and deliver the packaged enhanced media content to one or more content consumption user devices. Content delivery part 130 may deliver information about the event model created by aggregation and analysis part 110.

Content delivery part 130 may include best stream delivery part 802. Best stream delivery part 802 may determine from received media content and/or enhanced media content the best media content of the event for a given epoch of the time period. Best stream delivery part 802 may deliver the best media content. Best media content may have a corresponding viewpoint in the location of the event. The best media content may have the highest quality. The best media content may have the most salient information during the epoch about the event. The best media content may have the highest fidelity. The best media content may have the highest attention metric.

Content delivery part 130 may include selected stream delivery part 804. Users using content consumption user devices may select a viewpoint, which may correspond to a particular enhanced media content. Selected stream delivery part 804 may determine the enhanced media content that corresponds to the selected viewpoint and deliver the enhanced media content.

Content delivery part 130 may include multiplexing part 806. Multiplexing part 806 may package enhanced media content from a variety of viewpoints, e.g., as channels, into a multiplexed stream and deliver the multiplexed stream to one or more content consumption user devices. A user may select one of the channels in the multiplexed stream for consumption on a content consumption user device.

Content delivery part 130 may include asset delivery part 890. Asset delivery part 890 may deliver extracted assets packaged as enhanced media content to content consumption user devices. The assets may be rendered into two-dimensional images at the content consumption user devices The assets may be rendered for output to a user using a content consumption user device in an augmented reality setting, or a mixed reality setting.

Content delivery part 130 may include spatial information delivery part 810. Spatial information delivery part 810 may deliver spatial information in the event model created by aggregation and analysis part 110. Spatial information may include map information. Map information may include spatial information about the location. Map information may include spatial information associated with multi-view areas and/or salient areas. Map information may include spatial information associated with chapters of a story of the event.

Content delivery part 130 may include temporal information delivery part 820. Spatial information delivery part 810 may deliver temporal information in the event model created by aggregation and analysis part 110. Temporal information may include a timeline. A timeline may include epochs of the time period of the event. Epochs of a timeline may have associated multi-view areas and/or salient areas. Epochs of a timeline may have one or more associated chapters of a story of the event.

Content delivery part 130 may include security part 882. Security part 882 may confirm or verify content consumption user devices are authenticated and authorized to request and/or receive enhanced media content from production platform. In response to determining a content consumption user device is authorized to receive enhanced media content of a specific event, content delivery part 130 may deliver the enhanced media content. In some cases, the enhanced media content is encrypted to ensure that only authenticated and authorized content consumption user devices may decrypt and consume the enhanced media content.

In some embodiments, uniform resource locator or network paths usable for retrieving enhanced media content and/or generated filler content are packaged as enhanced media content and sent to content consumption user devices by content delivery part 130. and the assets are retrieved at the uniform resource locator or network paths at the content consumption user devices.

Exemplary Methods and Operations of a Production Platform

FIG. 9 illustrates a flow diagram of exemplary operations for delivering enhanced media content to some embodiments of the disclosure. The operations may be performed by production platform 104 and/or components of production platform 104 as illustrated in the FIGURES. In some cases, some of the operations may be performed by an input source (e.g., one of the input sources 102 of FIG. 1). In some cases, some of the operations may be performed by a content consumption user device (e.g., one of the content consumption user devices 106 of FIG. 1).

In 902, a production platform may receive a plurality of media content may be received. Media content may be captured by a plurality of user devices at different moving viewpoints during a time period.

In 904, the production platform may determine two or more of the media content are capturing a same area from multiple viewpoints during an epoch of the time period.

In 906, the production platform may reconstruct the area spatially and temporally for the epoch using the two or more of the media content capturing the area;

In 908, the production platform may transform the reconstructed area into multimedia content; and In 910, the production platform may deliver the multimedia content to an end user device.

FIG. 10 illustrates a flow diagram of exemplary operations for delivering enhanced media content to some embodiments of the disclosure. The operations may be performed by production platform 104 and/or components of production platform 104 as illustrated in the FIGURES. In some cases, some of the operations may be performed by an input source (e.g., one of the input sources 102 of FIG. 1). In some cases, some of the operations may be performed by a content consumption user device (e.g., one of the content consumption user devices 106 of FIG. 1).

In 1002, a production platform may receive a plurality of media content. The media content may be captured by a plurality of user devices at different viewpoints of a location during a time period.

In 1004, the production platform may identify one or more of a spatial blind spot and a temporal blind spot in the plurality of media content.

In 1006, the production platform may generate filler content.

In 1008, the production platform may insert the filler content into one or more of the spatial blind spot and temporal blind spot.

In 1010, the production platform may deliver enhanced media content to an end user device, the enhanced media content having the inserted filler content and the plurality of media content.

FIG. 11 illustrates a flow diagram of exemplary operations for delivering enhanced media content to some embodiments of the disclosure. The operations may be performed by production platform 104 and/or components of production platform 104 as illustrated in the FIGURES. In some cases, some of the operations may be performed by an input source (e.g., one of the input sources 102 of FIG. 1). In some cases, some of the operations may be performed by a content consumption user device (e.g., one of the content consumption user devices 106 of FIG. 1).

In 1102, a production platform may receive a plurality of media content. The media content may be captured by a plurality of user devices at different viewpoints of a location during a time period.

In 1104, the production platform may determine a first salient area and a second salient area of the location based on an attention metric measured from the plurality of media content. The attention metric may be based on a number of the plurality user devices capturing a given area.

In 1106, the production platform may produce a first enhanced media content reconstructing the first salient area using first media content capturing the first salient area;

In 1108, the production platform may produce a second enhanced media content reconstructing the second salient area using the second media content capturing the second salient area.

In 1110, the production platform may deliver enhanced media content to an end user device, the enhanced media content having the first enhanced media content, and the second enhanced media content.

Although the operations of the example method shown in and described with reference to FIGS. 9-11 are illustrated as occurring once each and in a particular order, it will be recognized that the operations may be performed in any suitable order and repeated as desired. Additionally, one or more operations may be performed in parallel. Furthermore, the operations illustrated in FIGS. 9-11 may be combined or may include more or fewer details than described.

Example Processing Device

Figure 12:
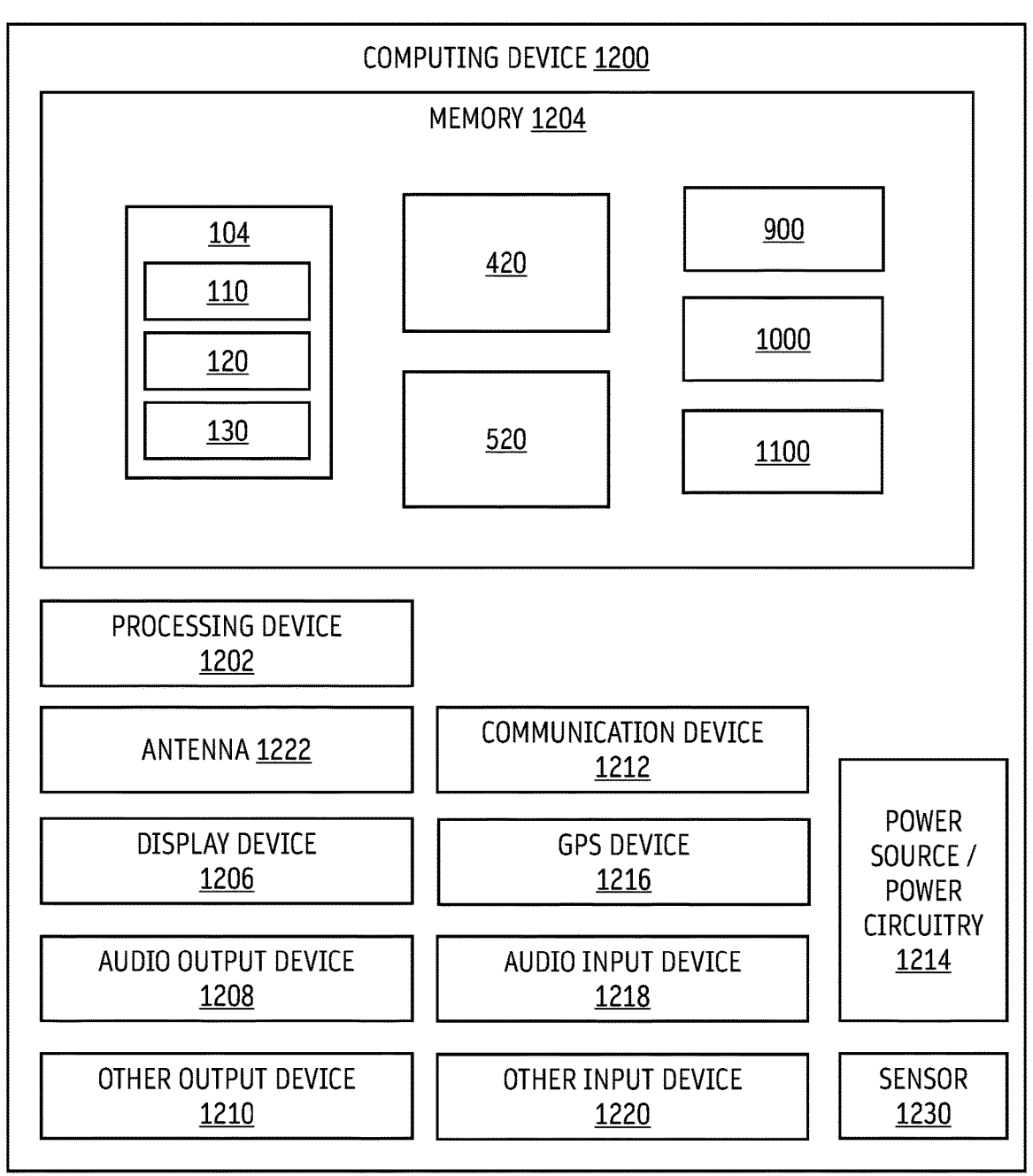
FIG. 12 illustrates a block diagram of an exemplary computing device, according to some embodiments of the disclosure.

FIG. 12 is a block diagram of an exemplary computing device 1200, according to some embodiments of the disclosure. One or more computing devices, such as computing device 1200, may be used to implement the functionalities described with reference to the FIGURES and herein. A number of components are illustrated in the FIGURES as included in the computing device 1200, but any one or more of these components may be omitted or duplicated, as suitable for the application. In some embodiments, some or all of the components included in the computing device 1200 may be attached to one or more motherboards. In some embodiments, some or all of these components are fabricated onto a single system on a chip (SoC) die. Additionally, in various embodiments, the computing device 1200 may not include one or more of the components illustrated in FIG. 12, and the computing device 1200 may include interface circuitry for coupling to the one or more components. For example, the computing device 1200 may not include a display device 1206, and may include display device interface circuitry (e.g., a connector and driver circuitry) to which a display device 1206 may be coupled. In another set of examples, the computing device 1200 may not include an audio input device 1218 or an audio output device 1208 and may include audio input or output device interface circuitry (e.g., connectors and supporting circuitry) to which an audio input device 1218 or audio output device 1208 may be coupled.

The computing device 1200 may include a processing device 1202 (e.g., one or more processing devices, one or more of the same type of processing device, one or more of different types of processing device). The processing device 1202 may include electronic circuitry that process electronic data from data storage elements (e.g., registers, memory, resistors, capacitors, quantum bit cells) to transform that electronic data into other electronic data that may be stored in registers and/or memory. Examples of processing device 1202 may include a central processing unit (CPU), a graphical processing unit (GPU), a quantum processor, a machine learning processor, an artificial intelligence processor, a neural network processor, an artificial intelligence accelerator, an application specific integrated circuit (ASIC), an analog signal processor, an analog computer, a microprocessor, a digital signal processor, a field programmable gate array (FPGA), a tensor processing unit (TPU), a data processing unit (DPU), etc. The computing device 1200 may include a memory 1204, which may itself include one or more memory devices such as volatile memory (e.g., DRAM), nonvolatile memory (e.g., read-only memory (ROM)), high bandwidth memory (HBM), flash memory, solid state memory, and/or a hard drive. Memory 1204 includes one or more non-transitory computer-readable storage media. In some embodiments, memory 1204 may include memory that shares a die with the processing device 1202. In some embodiments, memory 1204 includes one or more non-transitory computer-readable media storing instructions executable to perform operations described with the FIGURES, such as operations described with FIGS. 1, and 4-8, and the methods illustrated in FIGS. 9-11. Exemplary parts or modules that may be encoded as instructions and stored in memory 1204 are depicted. Memory 1204 may store instructions that encode one or more exemplary parts. The instructions stored in the one or more non-transitory computer-readable media may be executed by processing device 1202. In some embodiments, memory 1204 may store data, e.g., data structures, binary data, bits, metadata, files, blobs, etc., as described with the FIGURES and herein. Exemplary data that may be stored in memory 1204 are depicted. Memory 1204 may store one or more data as depicted.

In some embodiments, the computing device 1200 may include a communication device 1212 (e.g., one or more communication devices). For example, the communication device 1212 may be configured for managing wired and/or wireless communications for the transfer of data to and from the computing device 1200. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. The communication device 1212 may implement any of a number of wireless standards or protocols, including but not limited to Institute for Electrical and Electronic Engineers (IEEE) standards including Wi-Fi (IEEE 802.10 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication device 1212 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication device 1212 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication device 1212 may operate in accordance with Code-division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication device 1212 may operate in accordance with other wireless protocols in other embodiments. The computing device 1200 may include an antenna 1222 to facilitate wireless communications and/or to receive other wireless communications (such as radio frequency transmissions). The computing device 1200 may include receiver circuits and/or transmitter circuits. In some embodiments, the communication device 1212 may manage wired communications, such as electrical, optical, or any other suitable communication protocols (e.g., the Ethernet). As noted above, the communication device 1212 may include multiple communication chips. For instance, a first communication device 1212 may be dedicated to shorter-range wireless communications such as Wi-Fi or Bluetooth, and a second communication device 1212 may be dedicated to longer-range wireless communications such as global positioning system (GPS), EDGE, GPRS, CDMA, WiMAX, LTE, EV-DO, or others. In some embodiments, a first communication device 1212 may be dedicated to wireless communications, and a second communication device 1212 may be dedicated to wired communications.

The computing device 1200 may include power source/power circuitry 1214. The power source/power circuitry 1214 may include one or more energy storage devices (e.g., batteries or capacitors) and/or circuitry for coupling components of the computing device 1200 to an energy source separate from the computing device 1200 (e.g., DC power, AC power, etc.).

The computing device 1200 may include a display device 1206 (or corresponding interface circuitry, as discussed above). The display device 1206 may include any visual indicators, such as a heads-up display, a computer monitor, a projector, a touchscreen display, a liquid crystal display (LCD), a light-emitting diode display, or a flat panel display, for example.

The computing device 1200 may include an audio output device 1208 (or corresponding interface circuitry, as discussed above). The audio output device 1208 may include any device that generates an audible indicator, such as speakers, headsets, or earbuds, for example.

The computing device 1200 may include an audio input device 1218 (or corresponding interface circuitry, as discussed above). The audio input device 1218 may include any device that generates a signal representative of a sound, such as microphones, microphone arrays, or digital instruments (e.g., instruments having a musical instrument digital interface (MIDI) output).

The computing device 1200 may include a GPS device 1216 (or corresponding interface circuitry, as discussed above). The GPS device 1216 may be in communication with a satellite-based system and may receive a location of the computing device 1200, as known in the art.

The computing device 1200 may include a sensor 1230 (or one or more sensors). The computing device 1200 may include corresponding interface circuitry, as discussed above). Sensor 1230 may sense physical phenomenon and translate the physical phenomenon into electrical signals that can be processed by, e.g., processing device 1202. Examples of sensor 1230 may include: capacitive sensor, inductive sensor, resistive sensor, electromagnetic field sensor, light sensor, camera, imager, microphone, pressure sensor, temperature sensor, vibrational sensor, accelerometer, gyroscope, strain sensor, moisture sensor, humidity sensor, distance sensor, range sensor, time-of-flight sensor, pH sensor, particle sensor, air quality sensor, chemical sensor, gas sensor, biosensor, ultrasound sensor, a scanner, etc.

The computing device 1200 may include another output device 1210 (or corresponding interface circuitry, as discussed above). Examples of the other output device 1210 may include an audio codec, a video codec, a printer, a wired or wireless transmitter for providing information to other devices, haptic output device, gas output device, vibrational output device, lighting output device, home automation controller, or an additional storage device.

The computing device 1200 may include another input device 1220 (or corresponding interface circuitry, as discussed above). Examples of the other input device 1220 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1200 may have any desired form factor, such as a handheld or mobile computer system (e.g., a cell phone, a smart phone, a mobile internet device, a music player, a tablet computer, a laptop computer, a netbook computer, a personal digital assistant (PDA), an ultra-mobile personal computer, a remote control, wearable device, headgear, eyewear, footwear, electronic clothing, etc.), a desktop computer system, a server or other networked computing component, a printer, a scanner, a monitor, a set-top box, an entertainment control unit, a vehicle control unit, a digital camera, a digital video recorder, an Internet-of-Things device (e.g., light bulb, cable, power plug, power source, lighting system, audio assistant, audio speaker, smart home device, smart thermostat, camera monitor device, sensor device, smart home doorbell, motion sensor device), a virtual reality system, an augmented reality system, a mixed reality system, or a wearable computer system. In some embodiments, the computing device 1200 may be any other electronic device that processes data.

Select Examples

Example 1 provides a method including receiving a plurality of media content captured by a plurality of user devices at different moving viewpoints during a time period; determining that two or more of the media content are capturing a same area from multiple viewpoints during an epoch of the time period; reconstructing the area spatially and temporally for the epoch using the two or more of the media content capturing the area; transforming the reconstructed area into multimedia content; and delivering the multimedia content to an end user device.

Example 2 provides the method of example 1, where determining that two or more of the media content are capturing the same area based on location information and field of view information associated with the plurality of media content.

Example 3 provides the method of example 1 or 2, where determining that two or more of the media content are capturing the same area based on a common detection of one or more objects captured in the two or more of the media content.

Example 4 provides the method of any one of examples 1-3, where reconstructing the area includes extracting one or more four-dimensional assets, the one or more four-dimensional assets including three-dimensional spatial information and temporal information.

Example 5 provides the method of example 4, where transforming the reconstructed area into multimedia content includes packaging the four-dimensional assets into the multimedia content.

Example 6 provides the method of example 4, where transforming the reconstructed area into multimedia content includes rendering the four-dimensional assets; and generating the multimedia content from the rendering.

Example 7 provides the method of example 4, where transforming the reconstructed area into multimedia content includes determining a viewpoint of the area that has sufficient information about the area; rendering the four-dimensional assets based on the viewpoint; and generating the multimedia content from the rendering.

Example 8 provides the method of any one of examples 1-6, where transforming the reconstructed area into multimedia content includes mixing audio components corresponding to the two or more of the media content capturing the area.

Example 9 provides a method including receiving a plurality of media content captured by a plurality of user devices at different viewpoints of a location during a time period; identifying one or more of a spatial blind spot and a temporal blind spot in the plurality of media content; generating filler content; inserting the filler content into one or more of the spatial blind spot and temporal blind spot; and delivering enhanced media content to an end user device, the enhanced media content having the inserted filler content and the plurality of media content. 10. The method of example 9, where identifying the spatial blind spot includes determining one or more areas captured by the plurality of user devices at the different viewpoints at a first epoch of the time period; and determining one or more areas not captured by the plurality of user devices at the different viewpoints during the first epoch based on map of the location and the one or more areas captured by the plurality of user devices; where the spatial blind spot corresponds to an area not captured by the plurality of user devices during the first epoch. 11. The method of claim 9 or 10, where identifying the temporal blind spot includes determining one or more first epochs of the time period during which the plurality of user devices are capturing the plurality of media content; and determining one or more second epochs of the time period during which no user devices are capturing the plurality of media content based on a timeline of the time period and the one or more first epochs; where the temporal blind spot corresponds to a second epoch.

Example 12 provides the method of any one of examples 9-11, where generating the filler content includes determining one or more contextual cues of an area captured the plurality of user devices adjacent to the spatial blind spot; and creating the filler content based on the one or more contextual cues.

Example 13 provides the method of any one of examples 9-12, where generating the filler content includes determining one or more contextual cues of an epoch during which the plurality of user devices are capturing the plurality of media content adjacent to the temporal blind spot; and creating the filler content based on the one or more contextual cues.

Example 14 provides the method of any one of examples 9-13, where generating the filler content includes determining one or more detected objects of an area captured the plurality of user devices adjacent to the spatial blind spot; and creating the filler content based on the one or more detected objects.

Example 15 provides the method of any one of examples 9-14, where generating the filler content includes determining one or more detected objects of an epoch during which the plurality of user devices are capturing the plurality of media content adjacent to the temporal blind spot; and creating the filler content based on the one or more detected objects.

Example 16 provides the method of any one of examples 9-15, where generating the filler content includes extracting, from the plurality of media content, one or more four-dimensional assets, the one or more four-dimensional assets including three-dimensional spatial information and temporal information; and rendering the one or more four-dimensional assets.

Example 17 provides the method of any one of examples 9-16, where generating the filler content includes receiving one or more images of the location; and creating the filler content based on the one or more images.

Example 18 provides the method of example 17, where creating the filler content based on the one or more images includes generating a background asset of the location based on the one or more images; and rendering the background asset.

Example 19 provides the method of any one of examples 9-18, where generating the filler content includes receiving information about incidents that occurred during the time period; and creating the filler content based on the information about the incidents.

Example 20 provides the method of any one of examples 9-17, further including determining an improved viewpoint in the location different from one of the different viewpoints that would at least reduce a size of the spatial blind spot; and transmitting a message to a content capture user device suggesting to a user operating the content capture user device to capture content at the improved viewpoint.

Example 21 provides the method of example 20, where generating the filler content includes using one or more further media content captured by the content capture user device to produce the filler content.

Example 22 provides the method of any one of examples 9-21, further including determining a follow-up viewpoint in the location capturing at least a part of the spatial blind spot; and after the time period, transmitting a message to a content capture user device suggesting to a user operating the content capture user device to capture content at the follow-up viewpoint capturing the at least the part of the spatial blind spot.

Example 23 provides the method of example 22, where generating the filler content includes using one or more further media content captured by the content capture user device to produce the filler content.

Example 24 provides a method including receiving a plurality of media content captured by a plurality of user devices at different viewpoints of a location during a time period; determining a first salient area and a second salient area of the location based on an attention metric measured from the plurality of media content, the attention metric being based on a number of the plurality of user devices capturing a given area; producing a first enhanced media content reconstructing the first salient area using first media content capturing the first salient area; producing a second enhanced media content reconstructing the second salient area using second media content capturing the second salient area; and delivering enhanced media content to an end user device, the enhanced media content having the first enhanced media content, and the second enhanced media content.

Example 25 provides the method of example 24, further including identifying one or more of spatial blind spot and temporal blind spot of the plurality of media content; and generating and inserting filler content into one or more of the spatial blind spot and the temporal blind spot; where the enhanced media content further includes the inserted filler content.

Example 26 provides the method of example 24 or 25, where: the first salient area has a corresponding first epoch of the time period during which the first media content captured the first salient area; and the second salient area having a corresponding second epoch of the time period during which the second media content captured the second salient area, the second epoch being later in time than the first epoch.

Example 27 provides the method of any one of examples 24-26, where: the enhanced media content arranges the first enhanced media content before the second enhanced media content.

Example 28 provides the method of any one of examples 25-27, where: the enhanced media content arranges the filler content between the first enhanced media the second enhanced media content.

Example 29 provides the method of any one of examples 24-28, further including generating an event model having a timeline of the time period and a map of the location, where the first epoch in the timeline is linked with the first salient area in the map, and the second epoch in the timeline is linked with the second salient area in the map.

Example 30 provides the method of any one of examples 24-29, where the attention metric is based further on a number of users streaming media content capturing the given area for a given epoch.

Example 31 provides a production platform system including one or more of an aggregation and analysis part, a content enhancement part, and a content delivery part, as described herein.

Example 32 provides one or more non-transitory computer-readable storage media including instruction for execution which, when executed by one or more processors, cause the one or more processors to perform one or more methods of examples 1-30.

Example 33 provides an apparatus including means to perform or carry out any one or more methods of examples 1-30.

Variations and Other Notes

The description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

For purposes of explanation, specific numbers, materials and configurations are set forth in order to provide a thorough understanding of the illustrative implementations. However, it will be apparent to one skilled in the art that the present disclosure may be practiced without the specific details and/or that the present disclosure may be practiced with only some of the described aspects. In other instances, well known features are omitted or simplified in order not to obscure the illustrative implementations.

Further, references are made to the accompanying drawings that form a part hereof, and in which are shown, by way of illustration, embodiments that may be practiced. It is to be understood that other embodiments may be utilized, and structural or logical changes may be made without departing from the scope of the present disclosure. Therefore, the above detailed description is not to be taken in a limiting sense.

Various operations may be described as multiple discrete actions or operations in turn, in a manner that is most helpful in understanding the disclosed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A or B" or the phrase "A and/or B" means (A), (B), or (A and B). For the purposes of the present disclosure, the phrase "A, B, or C" or the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value as described herein or as known in the art. Similarly, terms indicating orientation of various elements, e.g., "coplanar," "perpendicular," "orthogonal," "parallel," or any other angle between the elements, generally refer to being within +/−5-20% of a target value as described herein or as known in the art.

In addition, the terms "comprise," "comprising," "include," "including," "have," "having" or any other variation thereof, are intended to cover a non-exclusive inclusion. For example, a method, process, or device, that comprises a list of elements is not necessarily limited to only those elements but may include other elements not expressly listed or inherent to such method, process, or device. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description and the accompanying drawings.

What is claimed is:

1. A method comprising:

receiving a plurality of media content captured by a plurality of user devices at different moving viewpoints during a time period;

determining that two or more of the plurality of media content are capturing a same area from multiple viewpoints during an epoch of the time period;

creating an event model, wherein the event model includes a timeline of the time period and a map of a location of an event;

reconstructing the area for the event model spatially and temporally for the epoch using the two or more of the plurality of media content capturing the area, wherein reconstructing the area comprises extracting one or more four-dimensional assets, the one or more four-dimensional assets including three-dimensional spatial information and temporal information;

identifying, for the event model, a blind spot based on the three-dimensional spatial information or the temporal information having insufficient coverage spatially or temporally respectively, wherein the blind spot includes one or more of a spatial blind spot and a temporal blind spot;

transforming the reconstructed area into multimedia content, wherein transforming the reconstructed area comprises generating filler content for the blind spot based on the event model and inserting the filler content into the blind spot; and delivering the multimedia content to an end user device.

2. The method of claim 1, wherein determining that the two or more of the plurality of media content are capturing the same area comprises determining that the two or more of the plurality of media content are capturing the same area based on location information and field of view information associated with the plurality of media content.

3. The method of claim 1, wherein determining that the two or more of the plurality of media content are capturing the same area comprises determining that the two or more of the plurality of media content are capturing the same area based on a common detection of one or more objects captured in the two or more of the plurality of media content.

4. The method of claim 1, wherein transforming the reconstructed area into the multimedia content comprises packaging the one or more four-dimensional assets into the multimedia content.

5. The method of claim 1, wherein transforming the reconstructed area into multimedia content comprises:

rendering the one or more four-dimensional assets according to a user-selected theme; and generating the multimedia content from the rendering.

6. The method of claim 1, wherein transforming the reconstructed area into the multimedia content comprises:

determining a viewpoint of the area that has sufficient information about the area;

rendering the one or more four-dimensional assets using volume rendering based on the viewpoint; and generating the multimedia content from the rendering.

7. The method of claim 1, wherein:

the spatial blind spot is an area that is not captured by the plurality of media content; and the temporal blind spot is a further epoch of the time period that is not captured by the plurality of media content.

8. The method of claim 1, wherein generating the filler content for the blind spot based on the event model comprises:

retrieving content associated with the event model, the content including one or more images of the location of the event associated with the event model.

9. The method of claim 1, further comprising:

determining one or more contextual cues for the event model adjacent to the spatial blind spot or the temporal blind spot;

wherein generating the filler content for the blind spot comprises creating the filler content based on the one or more contextual cues.

10. The method of claim 1, wherein generating the filler content for the blind spot based on the event model comprises:

generating the filler content using one or more of a generative machine learning model and a computer vision technique.

11. The method of claim 1, wherein generating the filler content for the blind spot based on the event model comprises:

receiving one or more images of the location of the event; and generating artificial content based on the one or more images of the location of the event.

12. A production platform, comprising:

an aggregation and analysis part to:

receive a plurality of media content captured by a plurality of user devices at different moving viewpoints during a time period;

determine that two or more of the plurality of media content are capturing a same area from multiple viewpoints during an epoch of the time period; and create an event model, wherein the event model includes a timeline of the time period and a map of a location of an event;

a content enhancement part to:

reconstruct the area for an event model spatially and temporally for the epoch using the two or more of the plurality of media content capturing the area by extracting one or more four-dimensional assets, the one or more four-dimensional assets including three-dimensional spatial information and temporal information;

identify, for the event model, a blind spot based on the three-dimensional spatial information or the temporal information having insufficient coverage spatially or temporally respectively, wherein the blind spot includes one or more of a spatial blind spot and a temporal blind spot; and transform the reconstructed area into multimedia content by generating filler content for the blind spot based on the event model and inserting the filler content into the blind spot; and a content delivery part to:

deliver the multimedia content to an end user device.

13. The production platform of claim 12, wherein determining that two or more of the plurality of media content are capturing the same area based on location information and field of view information associated with the plurality of media content.

14. The production platform of claim 12, wherein determining that two or more of the plurality of media content are capturing the same area based on a common detection of one or more objects captured in the two or more of the plurality of media content.

15. The production platform of claim 12, wherein transforming the reconstructed area into multimedia content comprises packaging the one or more four-dimensional assets into the multimedia content.

16. The production platform of claim 12, wherein transforming the reconstructed area into multimedia content comprises:

rendering the one or more four-dimensional assets according to a user-selected theme; and generating the multimedia content from the rendering.

17. The production platform of claim 12, wherein transforming the reconstructed area into multimedia content comprises:

determining a viewpoint of the area that has sufficient information about the area;

rendering the one or more four-dimensional assets using volume rendering based on the viewpoint; and generating the multimedia content from the rendering.

18. One or more non-transitory computer-readable storage media comprising instructions for execution which, when executed by one or more processors, cause the one or more processors to:

process a plurality of media content captured by a plurality of user devices at different moving viewpoints during a time period;

determine that two or more of the plurality of media content are capturing a same area from multiple viewpoints during an epoch of the time period;

create an event model, wherein the event model includes a timeline of the time period and a map of a location of an event;

reconstruct the area for the event model spatially and temporally for the epoch using the two or more of the plurality of media content capturing the area, wherein reconstructing the area comprises extracting one or more four-dimensional assets, the one or more four-dimensional assets including three-dimensional spatial information and temporal information;

identify, for the event model, a blind spot based on the three-dimensional spatial information or the temporal information having insufficient coverage spatially or temporally respectively, wherein the blind spot includes one or more of a spatial blind spot and a temporal blind spot;

generate multimedia content based on the reconstructed area, wherein generating multimedia content comprises generating filler content for the blind spot based on the event model and inserting the filler content into the blind spot; and transmit the multimedia content to an end user device.

19. The one or more non-transitory computer-readable storage media of claim 18, wherein determining that two or more of the plurality of media content are capturing the same area based on location information and field of view information associated with the plurality of media content.

20. The one or more non-transitory computer-readable storage media of claim 18, wherein determining that two or more of the plurality of media content are capturing the same area based on a common detection of one or more objects captured in the two or more of the plurality of media content.

* * * * *